US012461113B2

United States Patent
Habben et al.

(10) Patent No.: US 12,461,113 B2
(45) Date of Patent: Nov. 4, 2025

(54) IGFBP7 RATIO FOR HFpEF

(71) Applicant: Roche Diagnostics Operations, Inc., Indianapolis, IN (US)

(72) Inventors: Kai Habben, Mannheim (DE); Vinzent Rolny, Penzberg (DE); Anika Mang, Mannheim (DE); Ursula-Henrike Wienhues-Thelen, Penzberg (DE); Serge Masson, Rotkreuz (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 950 days.

(21) Appl. No.: 17/613,353

(22) PCT Filed: May 22, 2020

(86) PCT No.: PCT/EP2020/064276
§ 371 (c)(1),
(2) Date: Nov. 22, 2021

(87) PCT Pub. No.: WO2020/234451
PCT Pub. Date: Nov. 26, 2020

(65) Prior Publication Data
US 2022/0229075 A1 Jul. 21, 2022

(30) Foreign Application Priority Data
May 23, 2019 (EP) .................................. 19176160

(51) Int. Cl.
*G01N 33/74* (2006.01)
*G01N 33/68* (2006.01)
(52) U.S. Cl.
CPC ......... *G01N 33/74* (2013.01); *G01N 33/6893* (2013.01); *G01N 2333/4737* (2013.01);
(Continued)

(58) Field of Classification Search
CPC .............. G01N 33/74; G01N 33/6893; G01N 2333/4737; G01N 2333/58;
(Continued)

(56) References Cited

U.S. PATENT DOCUMENTS 4,016,043 A 4/1977 Schuurs et al.
4,018,653 A 4/1977 Mennen
(Continued)

FOREIGN PATENT DOCUMENTS

EP 0648228 B1 11/1998
WO 20020083913 A1 10/2002
(Continued)

OTHER PUBLICATIONS

Christoph Sinning, Tibor Kempf, Michael Schwarzl, Simon Lanfermann, Francisco Ojeda, et al., Biomarkers for characterization of heart failure—Distinction of heart failure with preserved and reduced ejection fraction, International Journal of Cardiology, vol. 227, 2017, pp. 272-277 (Year: 2017).*

(Continued)

*Primary Examiner* — Bao-Thuy L Nguyen
*Assistant Examiner* — Michael Cameron Sveiven
(74) *Attorney, Agent, or Firm* — Taft Stettinius & Hollister LLP

(57) ABSTRACT

The present invention relates to a method for differentiating between heart failure with preserved ejection fraction (HFpEF) and heart failure with reduced ejection fraction (HFrEF) in a subject suffering from heart failure, said method comprising the steps of determining the amounts of IGFBP7 (Insulin-like growth factor-binding protein 7), of a BNP-type peptide, and optionally of CRP (C-reactive protein) in a sample from the subject, calculating (i) a ratio of the amount of IGFBP7 and the amount of the BNP-peptide or (ii) a ratio of the sum of the amounts of IGFBP7 and CRP (Continued)

Figure 1A:
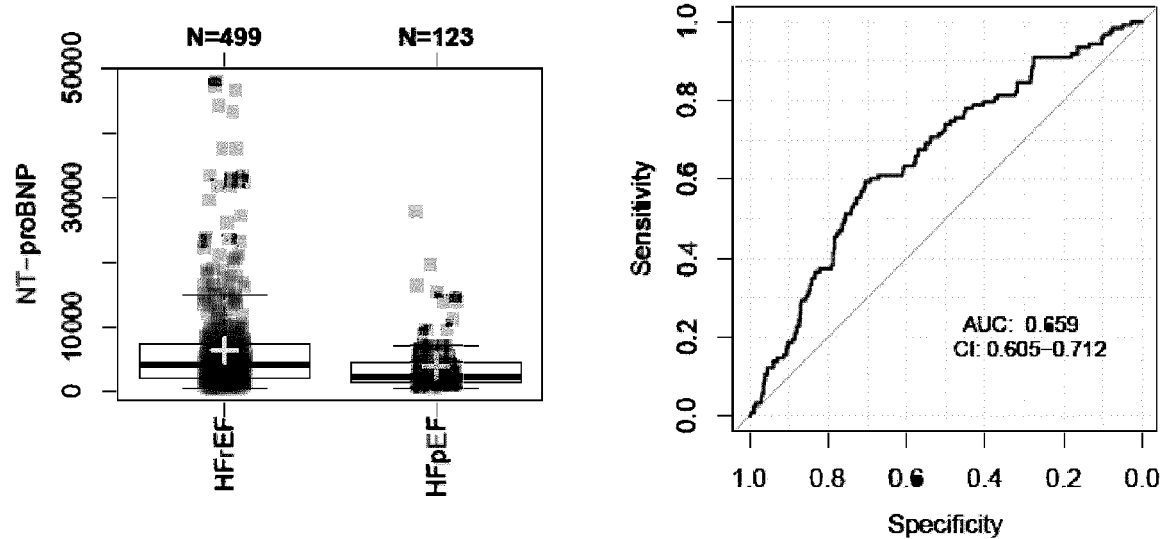
Figure 1B:
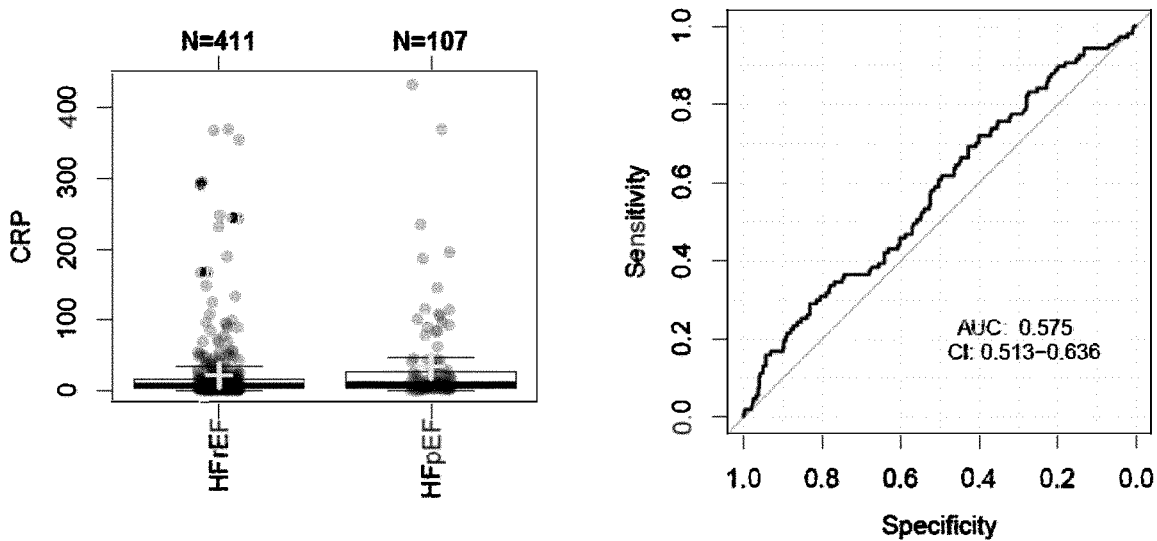
Figure 1C:
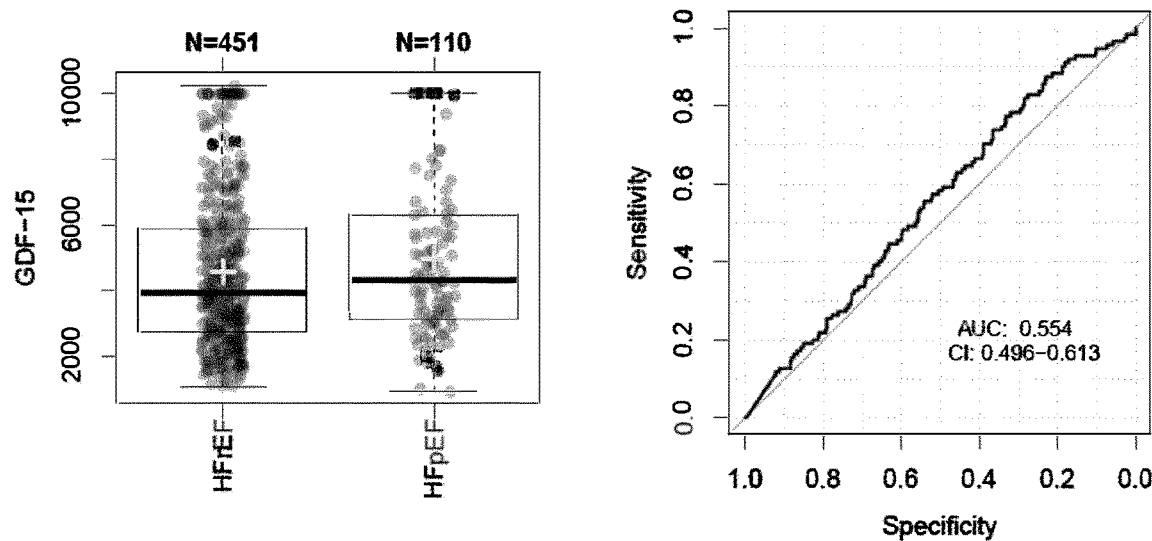
Figure 1D:
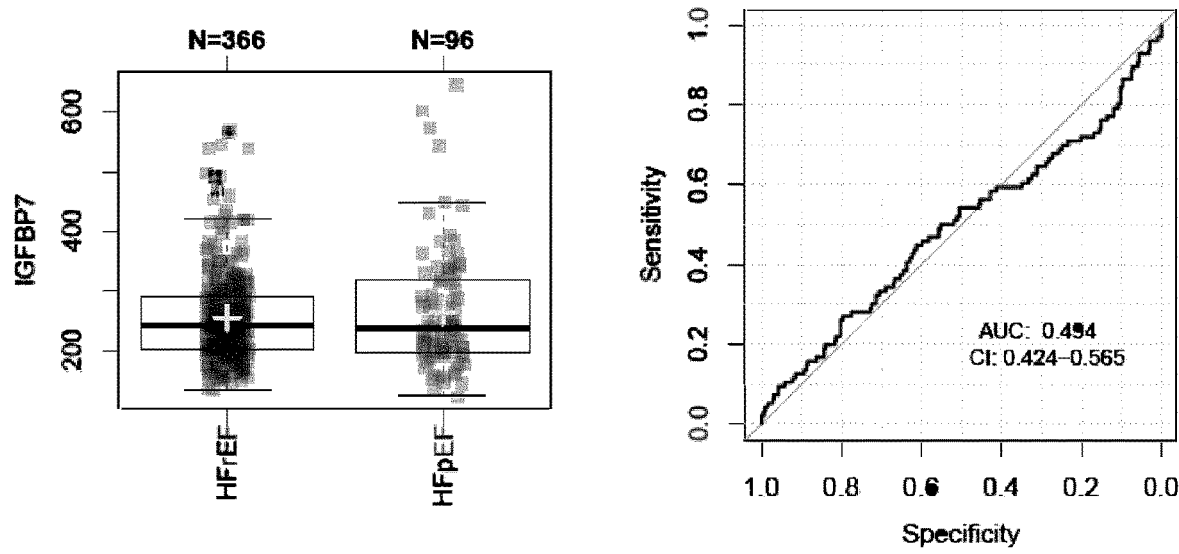

and the amount of the BNP-type peptide, comparing the ratio calculated with a reference ratio, and differentiating between heart failure with preserved ejection fraction (HFpEF) and heart failure with reduced ejection fraction (HFrEF). The present invention further concerns a method for the diagnosis of HFpEF.

10 Claims, 5 Drawing Sheets

(52) U.S. Cl.
CPC ..... *G01N 2333/58* (2013.01); *G01N 2333/65* (2013.01); *G01N 2800/325* (2013.01); *G01N 2800/56* (2013.01)

(58) Field of Classification Search
CPC ......... G01N 2333/65; G01N 2800/325; G01N 2800/56; G01N 2333/4745; G01N 33/68
See application file for complete search history.

(56) References Cited

U.S. PATENT DOCUMENTS

| | | | |
|---|---|---|---|
| 4,424,279 | A | 1/1984 | Bohn et al. |
| 2015/0293122 | A1* | 10/2015 | Wienhues-Thelen ........................ G01N 33/6893 435/7.92 |
| 2016/0334419 | A1* | 11/2016 | Block ................. G01N 33/6893 |
| 2017/0216242 | A1 | 8/2017 | Rajasekhar |
| 2017/0234888 | A1 | 8/2017 | Defilippi et al. |
| 2018/0127752 | A1 | 5/2018 | Liu et al. |

FOREIGN PATENT DOCUMENTS

| | | |
|---|---|---|
| WO | 2002089657 A2 | 11/2002 |
| WO | 2008089994 A1 | 7/2008 |
| WO | 2012107419 A1 | 8/2012 |
| WO | 2014086833 A1 | 6/2014 |
| WO | 2015113889 A1 | 8/2015 |
| WO | 2015144767 A1 | 10/2015 |

OTHER PUBLICATIONS

ACC/AHA Practice Guidelines; ACC/AHA Guidelines for the Evaluation and Management of Chronic Heart Failure in the Adult: Executive Summary a Report of the American College of Cardiology/ American Heart Association Task Force on Practice Guidelines (Committee to Revise the 1995 Guidelines for the Evaluation and Management of Heart Failure); 2001, vol. 38, No. 7, 13-pages.
ACC/AHA 2005 Guideline Update for the Diagnosis and Management of Chronic Heart Failure in the Adult a Report of the American College of Cardiology/American Heart Association Task Force on Practice Guidelines (Writing Committee to Update the 2001 Guidelines for the Evaluation and Management of Heart Failure); 82-pages.
Ahmad et al., The Trifecta of Precision Care in Heart Failure: Biology, Biomarkers, and Big Data; J. Am. Coll. Cardiol, 2018; vol. 72, No. 10, pp. 1091-1094.
Akaogi et al., Specific accumulation of tumor-derived adhesion factor in tumor blood vessels and in capillary tube-like structures of cultured vascular endothelial cells; 1996, Proc. Natl. Acad. Sci., Cell Biology; vol. 93, pp. 8384-8389.
Burger et al., Down-regulation of T1A12/mac25, a novel insulin-like growth factor binding protein related gene, is associated with disease progression in breast carcinomas; 1998, Oncogene, vol. 16, pp. 2459-2467.
Chow et al., Role of Biomarkers for the Prevention, Assessment, and Management of Heart Failure a Scientific Statement From the American Heart Association; 2017, Circulation, vol. 135, pp. e1054-e1091.
Cypen et al., Novel Biomarkers for the Risk Stratification of Heart Failure with Preserved Ejection Fraction; 2017, Curr Heart Fail Rep, vol. 14, pp. 434-443.
GenBank Accession NP001240764; insulin-like growth factor-binding protein 7 isoform 2 precursor [*Homo sapiens*] NCBI Reference Sequence: NP_001240764.1; 6-pages.
Hage et al., Comparison of Prognostic Usefulness of Serum Insulin-Like Growth Factor-Binding Protein 7 in PatientsWith Heart Failure and Preserved Versus Reduced Left Ventricular Ejection Fraction; 9-pages.
Januzzi et al., IGFBP7 (Insulin-Like Growth Factor-Binding Protein-7) and Neprilysin Inhibition in Patients With Heart Failure; Circulation: Heart Failure; 2018, vol. 11, 9-pages.
McMurray et al., ESC Guidelines for the diagnosis and treatment of acute and chronic heart failure 2012; The Task Force for the Diagnosis and Treatment of Acute and Chronic Heart Failure 2012 of the European Society of Cardiology. Developed in collaboration with the Heart Failure Association (HFA) of the ESC; European Heart Journal, 2012, vol. 333, pp. 1787-1847.
Mueller et al., Long-term stability of endogenous B-type natriuretic peptide (BNP) and amino terminal proBNP (NT-proBNP) in frozen plasma samples; Clin Chem Lab Med., 2004, vol. 42, No. 8, pp. 942-944.
Oh et al., Synthesis and Characterization of Insulin-like Growth Factorbinding Protein (IGFBP)-7; Communication, the Journal of Biological Chemistry; 1996, vol. 271, No. 48, pp. 30322-30325.
Ono et al., Expression of prostacyclin-stimulating factor, a novel protein, in tissues of Wistar rats and in cultured cells; Biochemical and Biophysical Research Communications; 1994, vol. 202, No. 3, pp. 1490-1496.
Richter, Electrochemiluminescience (ECL); Chem. Rev., 2004, vol. 104, pp. 3003-3036.
Rivera et al., Obese subjects with heart failure have lower N-terminal pro-brain natriuretic peptide plasma levels irrespective of aetiology; The European Journal of Heart Failure; 2005, vol. 7, pp. 1168-1170.
Sinning et al., Biomarkers for characterization of heart failure—Distinction of heart failure with preserved and reduced ejection fraction; International Journal of Cardiology; 2017, vol. 227, pp. 272-277.
Smith et al., Delayed metabolism of human brain natriuretic peptide reflects resistance to neutral endopeptidase; Journal of Endocrinology, 2000, vol. 167, pp. 239-246.
Sprenger et al., Insulin-like Growth Factor Binding Protein-related Protein 1 (IGFBP-rP1) Is a Potential Tumor Suppressor Protein for Prostate Cancer1; Cancer Research, 1999; vol. 59, pp. 2370-2375.
St Croix et al., Genes Expressed in Human Tumor Endothelium; Science, 2000, vol. 289, 7-pages.
Tschope et al., Heart failure with preserved ejection fraction: current management and future strategies Expert opinion on the behalf of the Nucleus of the "Heart Failure Working Group" of the German Society of Cardiology (DKG); Clin Res Cardiol., 2018, vol. 107, pp. 1-19.
UniProt Database Entry Q16270-1 and 2; 3-pages.
Watanabe et al., Insulin-like growth factor axis (insulin-like growth factor-I/insulin-like growth factor-binding protein-3) as a prognostic predictor of heart failure: association with adiponectin; European Journal of Heart Failure, 2010, vol. 12, pp. 1214-1222.
Woo et al., Characterization of Genomic and Complementary DNA Sequence of Human C-reactive Protein, and Comparison with the Cornpiementary DNA Sequence of Serum Amyloid P Component; The Journal of Biological Chemistry; 1985, vol. 260, No. 24, pp. 1384-1388.
Wu et al., Analytical and Clinical Evaluation of the Bayer ADVIA Centaur Automated B-Type Natriuretic Peptide Assay in Patients with Heart Failure: A Multisite Study; Clinical Chemistry; Lipids, Lipoproteins, and Cardiovascular Risk Factors; 2004, vol. 50, No. 5, pp. 867-873.
Yeh, CRP as a Mediator of Disease; Circulation is available at http://www.circulationaha.org; 5-pages.

(56) References Cited

OTHER PUBLICATIONS

Barroso, M.C., et al., "Serum insulin-like growth factro-1 and its binding protein-7: potential novel biomarkers for heart failure with preserved ejection fraction," BMC Cardiovascular Disorders, 2016, vol. 16, No. 199, p. 1-9.
International Search Report, European Patent Office, International Patent Application No. PCT/EP2020/064276, Jul. 14, 2020, 3 pages.
Written Opinion of the International Searching Authority, European Patent Office, International Patent Application No. PCT/EP2020/064276, Jul. 14, 2020, 5 pages.
International Preliminary Report on Patentability, European Patent Office, International Patent Application No. PCT/EP2020/064276, Aug. 13, 2021, 10 pages.
Wijk et al., Circulating biomarkers of distinct pathophysiological pathways in heart failure with preserved vs. reduced left ventricular ejection fraction, Eur J Heart Fail., vol. 17, No. 10, Oct. 2015, pp. 1006-1014.
Hage et al., Comparison of Prognostic Usefulness of Serum Insulin-Like Growth Factor-Binding Protein 7 in Patients With Heart Failure and Preserved Versus Reduced Left Ventricular Ejection Fraction, Am J Cardiol., vol. 121, No. 12, Jun. 15, 2018 (Jun. 15, 2018), pp. 1558-1566.
Dowdy et al., Statistics for Research, 1983, John Wiley & Sons.
Zweig et al., Receiver-operating characteristic (ROC) plots: a fundamental evaluation tool in clinical medicine, Clin. Chem., vol. 39, 1993, pp. 561-577.
Chinese Master's Theses, Full-text Database, E-journal No. 12, Dec. 15, 2018, Chen Hong, Clinical characteristics and prognostic factors analysis of heart failure with preserved ejection fraction.
Japanese Office Action, Japan Patent Office, Japanese Patent Application No. 2021-569358, Jan. 26, 2024, 6 pages.

* cited by examiner

IGFBP7 RATIO FOR HFpEF

This application is a national phase application of International Application No. PCT/EP2020/064276 filed May 22, 2020, which claims priority to European Application No. 19176160.0 filed May 23, 2019, the disclosures of which are hereby incorporated by reference in their entirety.

The present invention relates to a method for differentiating between heart failure with preserved ejection fraction (HFpEF) and heart failure with reduced ejection fraction (HFrEF) in a subject suffering from heart failure, said method comprising the steps of determining the amounts of IGFBP7 (Insulin-like growth factor-binding protein 7), of a BNP-type peptide, and optionally of CRP (C-reactive protein) in a sample from the subject, calculating (i) a ratio of the amount of IGFBP7 and the amount of the BNP-peptide or (ii) a ratio of the sum of the amounts of IGFBP7 and CRP and the amount of the BNP-type peptide, comparing the ratio calculated with a reference ratio, and differentiating between heart failure with preserved ejection fraction (HFpEF) and heart failure with reduced ejection fraction (HFrEF). The present invention further concerns a method for the diagnosis of HFpEF.

The use of biomarkers for the care of patients with heart failure (HF) has expanded significantly. The natriuretic peptides (NPs), including B-type natriuretic peptide (BNP) and its amino-terminal cleavage equivalent (NT-proBNP) are now widely used for diagnosis, prognosis, and management of affected patients. Following BNP and NT-proBNP, a wide range of novel biomarkers are being examined, each with potential promise for additive evaluation of patients suffering from the complex pathophysiology of HF. In this regard, there has been considerable effort to better understand the mechanistic link(s) between concentrations of cardiac biomarkers and the underlying cardiovascular pathophysiological processes from which they are released.

Many prior art references describe the use of marker combinations in the assessment of heart failure, e.g. in connection with heart failure with preserved ejection fraction (HFpEF) and heart failure with reduced ejection fraction (HFrEF) For example, Sanders evaluates whether biomarkers reflecting pathophysiological pathways are different between HFpEF and HfrEF and whether the prognostic value of biomarkers is different in HFpEF vs. HfrEF (Eur J Heart Fail. 2015 October; 17(10):1006-14. doi: 10.1002/ejhf.414. Epub 2015 Oct. 16). The study describes that HFpEF patients exhibited higher soluble interleukin 1 receptor-like 1, high sensitivity C-reactive protein, and cystatin-C. In contrast, HFrEF patients exhibited higher NT-proBNP, high sensitivity troponin T and hemoglobin.

Sinning describes the measurement of CRP, GDF-15, sST2 and NT-proBNP in patients with HFrEF and HFpEF (Int J Cardiol. 2017 Jan. 15; 227:272-277. doi: 10.1016/j.ijcard.2016.11.110. Epub 2016 Nov. 9). According to Sinning, the index of ((CRP+GDF-15s+sST2)/NT-proBNP) was able to discriminate HFpEF from HFrEF.

The insulin-like growth factor axis has previously been found to be a predictor of outcomes in HF (Watanabe et al., Insulin-like growth factor axis (insulin-like growth factor-i/insulin-like growth factor-binding protein-3) as a prognostic predictor of heart failure: Association with adiponectin, Eur J Heart Fail. 2010; 12:1214-1222). IGFBP-7 (Insulin-like Growth Factor Binding Protein 7) is a 30-kDa modular glycoprotein known to be secreted by endothelial cells, vascular smooth muscle cells, fibroblasts, and epithelial cells (Ono et al., Biochem Biophys Res Comm 202 (1994) 1490). IGFBP-7 has been described to be associated with cellular senescence, tissue aging, and obesity. IGFBP-7 has been proposed as marker of diastolic dysfunction and HFpEF, a disease of the elderly and obese. A mechanistic link between IGFBP-7 and diastolic impairment was demonstrated in a mouse model (US2018/0127752). Elevated circulated levels of IGFBP-7 have been described in association with diastolic abnormalities in the PARAMOUNT study (Januzzi et al., Circ Heart Fail. (2018) 11).

WO 2008/089994 discloses IGFBP7 in the assessment of Heart Failure. In addition to IGFBP7, NTproBNP and CRP can be determined.

WO 2015/144767 describes IGFBP7 as a marker in diastolic dysfunction. In Example 2.2, patients with HFpEF were analyzed. In this Example, IGFBP7 was combined with e.g. Osteopontin, Troponin T and NT-proBNP.

WO 2014/086833 describes IGFBP7 as a marker in the selection of therapy of heart failure.

IGFBP7 has been also analyzed in connection with HFpEF and HFrEF. For example, Hage describes that IGFBP-7 was lower in HFpEF than HFrEF (Am J Cardiol. 2018 Jun. 15; 121(12):1558-1566. doi: 10.1016/j.amjcard.2018.02.041. Epub 2018 Mar. 14).

Diagnosis of HFpEF is challenging due to normal ejection fraction. It is mainly based on symptoms, which can be vague, and the exclusion of other causes such as lung disease. Moreover, the biomarker-based diagnosis of HFpEF is cumbersome. So far, no biomarker was established in clinical routine to aid diagnosis of HFpEF. NTproBNP shows stronger associations to systolic dysfunction versus diastolic abnormalities. It is only moderately increased in HFpEF. Although IGFBP-7 shows a mechanistic link to diastology, there is no description that IGFBP-7 aids the identification of patients with preserved ejection fraction.

As reviewed by Tschope, presentation and pathophysiology of HFpEF is heterogeneous and its management remains a challenge (Clin Res Cardiol. 2018 January; 107(1):1-19. doi: 10.1007/s00392-017-1170-6. Epub 2017 Oct. 10). Up to now, there are no therapies improving survival in patients with HFpEF. Thus, the treatment targets symptom relief, quality of life and reduction of cardiac decompensations by controlling fluid retention and managing risk factors and comorbidities. For example, currently angiotensin-aldosterone inhibitors, diuretics, calcium channel blockers (CBB) and beta-blockers are used in the treatment of HFpEF. However, it has not been proven yet in large randomized controlled trials that these medicaments reduce mortality. Recently, new targets for the treatment of HFpEF have been identified, e.g. soluble guanylate cyclase stimulators, inorganic nitrates, the angiotensin receptor neprilysin inhibitor LCZ 696, and SGLT2 inhibitors. Patients suffering from HFpEF might particularly benefit from these new treatments.

Biomarker-based methods that could be used for reliably assessing HFpEF and for differentiating between HFrEF and HFpEF are highly required. The technical problem underlying the present invention can be seen as the provision of means and methods for complying with the aforementioned needs.

The technical problem is solved by the embodiments characterized in the claims and herein below.

Advantageously, it has been found in the studies underlying the present invention that the ratio of IGFBP-7 to a BNP-type peptide (such as NT-proBNP) and the ratio of the sum of the amounts of IGFBP-7+CRP to the amount of a BNP-type peptide improve the distinct identification of HFpEF in heart failure patients versus each of the markers alone. Thus, the aforementioned ratios allow for the reliable differentiation between heart failure with preserved ejection fraction (HFpEF) and heart failure with reduced ejection fraction (HFrEF) in a subject suffering from heart failure.

Accordingly, the present invention relates to a method for differentiating between heart failure with preserved ejection fraction (HFpEF) and heart failure with reduced ejection fraction (HFrEF) in a subject suffering from heart failure, said method comprising the steps of
  (a) determining the amounts of IGFBP7 (Insulin-like growth factor-binding protein 7), of a BNP-type peptide, and optionally of CRP (C-reactive protein) in a sample from the subject,
  (b) calculating (i) a ratio of the amount of IGFBP7 and the amount of the BNP-peptide or (ii) a ratio of the sum of the amounts of IGFBP7 and CRP and the amount of the BNP-type peptide,
  (c) comparing the ratio calculated in step (b) with a reference ratio, and
  (d) differentiating between heart failure with preserved ejection fraction (HFpEF) and heart failure with reduced ejection fraction (HFrEF).

The present invention further concerns a method for diagnosing heart failure with preserved ejection fraction (HFpEF) in a subject suspected of suffering from HFpEF, said method comprising the steps of
  (a) determining the amounts of IGFBP7 (Insulin-like growth factor-binding protein 7), of a BNP-type peptide, and optionally of CRP (C-reactive protein) in a sample from the subject,
  (b) calculating (i) a ratio of the amount of IGFBP7 and the amount of the BNP-peptide or (ii) a ratio of the sum of the amounts of IGFBP7 and CRP and the amount of the BNP-type peptide,
  (c) comparing the ratio calculated in step (b) with a reference ratio, and
  (d) diagnosing heart failure with preserved ejection fraction.

In an embodiment of the methods of the present invention, the amounts of IGFBP7, a BNP-type peptide and CRP are determined in step (a), and a ratio of the sum of the amounts of IGFBP7 and CRP and the amount of the BNP-type peptide is calculated in step (b). Accordingly, steps (a) and (b) are as follows:
  (a) determining the amounts of IGFBP7, a BNP-type peptide and CRP in a sample from the subject,
  (b) calculating a ratio of the sum of the amounts of IGFBP7 and CRP and the amount of the BNP-type peptide.

The method of the present invention, preferably, is an ex vivo or, in particular, an in vitro method. Moreover, it may comprise steps in addition to those explicitly mentioned above.

For example, further steps may relate to sample pretreatments or evaluation of the results obtained by the method. The method may be carried out manually or assisted by automation. Preferably, steps (a), (b), (c) and/or (d) may in total or in part be assisted by automation, e.g., by a suitable robotic and sensory equipment for the measurement in step (a) or a computer-implemented calculation in step (b), or a computer-implemented comparison in step (c) and/or a computer-implemented differentiation/diagnosis based on the comparison in step (c).

The term "diagnosing" as used herein means assessing whether a subject as referred to herein suffers from HFpEF, or not. In an embodiment, it is diagnosed that a subject suffers from HFpEF. In an alternative embodiment, it is diagnosed that a subject does not suffer from HFpEF.

The diagnosis in step (d) or the differentiation in step (d) is based on the results of the comparison step (c). Preferably, the diagnosis in step (d) is based on the results of the comparison step (c). However, it is to be understood that actual diagnosis whether a subject suffers from AF, or not may comprise further steps such as the confirmation of a diagnosis. Accordingly, the diagnosis as referred to herein shall allow for assessing the likelihood that a subject suffers from HFpEF. It follows from the above that the diagnosis of HFpEF is understood as an aid in the diagnosis of HFpEF. Accordingly, the term "diagnosing" in the context of the present invention also encompasses aiding the physician to assess whether a subject suffers from HFpEF, or not.

The term "differentiating" as used herein means to distinguish between HFpEF and HFpEF in a subject suffering. The term as used herein, preferably, includes differentially diagnosing HFpEF and HFrEF in a subject suffering from heart failure. Preferably, the differentiation in step (d) is based on the results of the comparison step (c). Again, the method of the present invention allows for assessing whether a subject with atrial fibrillation suffers from paroxysmal atrial fibrillation or persistent atrial fibrillation. The actual differentiation may comprise further steps such as the confirmation of the differentiation. Thus, the term "differentiating" in the context of the present invention also encompasses aiding the physician to differentiate between HFpEF and HFrEF.

As will be understood by those skilled in the art, the assessments described herein, i.e. the differentiation or the diagnosis, are usually not intended to be correct for all (i.e. 100%) of the patients to be diagnosed/graded. In an embodiment of the present invention, a statistically significant portion of patients can be identified (e.g. a cohort in a cohort study). Whether a portion is statistically significant can be determined without further ado by the person skilled in the art using various well known statistic evaluation tools, e.g., determination of confidence intervals, p-value determination, Student's t-test, Mann-Whitney test etc. Details are found in Dowdy and Wearden, Statistics for Research, John Wiley & Sons, New York 1983. Preferred confidence intervals are at least 90%, at least 95%, at least 97%, at least 98% or at least 99%. The p-values are, preferably, 0.1, 0.05, 0.01, 0.005, or 0.0001. More preferably, at least 60%, at least 70%, at least 80% or at least 90% of the patients of a population can be properly diagnosed/differentiated by the method of the present invention.

The "subject" as referred to herein is, preferably, a mammal. Mammals include, but are not limited to, domesticated animals (e.g., cows, sheep, cats, dogs, and horses), primates (e.g., humans and non-human primates such as monkeys), rabbits, and rodents (e.g., mice and rats). Preferably, the subject is a human subject. The terms "subject", "patient" and "individual" may be used interchangeably herein.

In accordance with the method for differentiating between HFpEF and HFrEF, the patient to be tested shall suffer from heart failure. The term "heart failure" is well known in the art. As used, herein the term, preferably, relates to an impaired function of the heart being accompanied by symptoms of heart failure as known to the person skilled in the art. Accordingly, the patient preferably suffers from symptomatic heart failure.

The ACC/AHA classification is a classification for heart failure developed by the American College of Cardiology and the American Heart Association (see J. Am. Coll. Cardiol. 2001; 38; 2101-2113, updated in 2005, see J. Am. Coll. Cardiol. 2005; 46; e1-e82). 4 stages A, B, C and D are defined. Stages A and B are not HF (heart failure) but are considered to help identify patients early before developing "truly" HF. Stages A and B patients are best defined as those with risk factors for the development of HF. For example, patients with coronary artery disease, hypertension, or diabetes mellitus who do not yet demonstrate impaired left ventricular (LV) function, hypertrophy, or geometric chamber distortion would be considered stage A, whereas patients who are asymptomatic but demonstrate LV hypertrophy (LVH, a phenomenon in which the walls of the ventricles thicken) and/or impaired LV function would be designated as stage B. Stage C then denotes patients with current or past symptoms of HF associated with underlying structural heart disease (the bulk of patients with HF), and stage D designates patients with truly refractory HF.

In an embodiment of the methods of the present invention, the patient to be tested shall, preferably, suffer from heart failure stage C or D according to the ACC/AHA classification (see citation above). In these stages, the patient shows symptoms of heart failure. Symptoms of heart failure are well known in the art and include dyspnea, fatigue and fluid retention. Fluid retention may lead to pulmonary congestion and peripheral edema, typical signs on the physical examination are edema and rales. Accordingly, the patient to be tested preferably shows symptoms of heart failure.

In accordance with the present invention, it shall be differentiated between heart failure with preserved ejection fraction (HFpEF) and heart failure with reduced ejection fraction (HFrEF) in a subject suffering from heart failure.

A subject suffering from HFrEF has heart failure with a reduced left ventricular ejection fraction (LVEF). The term "left ventricular ejection fraction" is well known in the art. A patient who has reduced LVEF, preferably, has a LVEF of less than 50%, more preferably, of less than 45% and most preferably, of less than 40%. Further, it is envisaged that the patient has a LVEF of less than 30%.

A subject suffering from HFpEF has heart failure with a preserved LVEF. Accordingly, the term HFpEF preferably refers to heart failure with a LVEF equal to or larger than 50%. A patient who has a preserved LVEF may also have a LVEF of larger than 55% or larger than 60%.

How to assess the LVEF is well known in the art. In an embodiment, the LVEF may be determined as e.g. described by McMurray et al. (European Heart Journal (2012) 33, 1787-1847, see e.g. page 1800 and following).

In an embodiment of the method for diagnosing HFpEF, the patient to be tested shall be suspected to suffer from heart failure, in particular from HFpEF. A subject who is suspected to suffer from heart failure, preferably, shows symptoms of heart failure. In an alternative embodiment of the method for diagnosing HFpEF, the patient to be tested shall suffer from heart failure. Accordingly, the patient shall be known to suffer from heart failure.

The patient to be tested in accordance with the method for diagnosing HFpEF may have a normal ejection fraction, i.e. a preserved LVEF.

In accordance with the present invention, the subject to be tested may be aged and/or overweight.

Preferably, the subject is older than 50 years of age, more preferably older than 60 years, or most preferably older than 75 years of age. Alternatively or additionally, the subject has a body mass index (BMI) of more than 25 kg/m$^2$, in particular of more than 27.5 kg/m$^2$. Further, the subject may have a BMI of more than 30.0 kg/m$^2$.

The term "sample" refers to a sample of a body fluid, to a sample of separated cells or to a sample from a tissue or an organ. Samples of body fluids can be obtained by well-known techniques and include, samples of blood, plasma, serum, urine, lymphatic fluid, sputum, ascites, or any other bodily secretion or derivative thereof. Preferred body fluid samples are urine, blood, serum or plasma. Tissue or organ samples may be obtained from any tissue or organ by, e.g., biopsy. Separated cells may be obtained from the body fluids or the tissues or organs by separating techniques such as centrifugation or cell sorting. E.g., cell-, tissue- or organ samples may be obtained from those cells, tissues or organs which express or produce the biomarker. The sample may be frozen, fresh, fixed (e.g. formalin fixed), centrifuged, and/or embedded (e.g. paraffin embedded), etc. The cell sample can, of course, be subjected to a variety of well-known post-collection preparative and storage techniques (e.g., nucleic acid and/or protein extraction, fixation, storage, freezing, ultrafiltration, concentration, evaporation, centrifugation, etc.) prior to assessing the amount of the marker in the sample.

Further, it is envisaged that a blood sample is a dried blood spot sample. Dried blood spot samples can be obtained by applying drops of blood onto absorbent filter paper. The blood is allowed to thoroughly saturate the paper and is air dried for several hours. The blood may have been drawn by a lancet from the subject to be tested, e.g. from the finger.

In a preferred embodiment, the sample is a blood (i.e. whole blood), serum or plasma sample. Serum is the liquid fraction of whole blood that is obtained after the blood is allowed to clot. For obtaining the serum, the clot is removed by centrifugation and the supernatant is collected. Plasma is the acellular fluid portion of blood. For obtaining a plasma sample, whole blood is collected in anticoagulant-treated tubes (e.g. citrate-treated or EDTA-treated tubes). Cells are removed from the sample by centrifugation and the supernatant (i.e. the plasma sample) is obtained.

In accordance with the present invention, the amount of Insulin-like Growth Factor Binding Protein 7 (=IGFBP-7) shall be determined. Preferably, the amount of the IGFBP-7 polypeptide is determined. IGFBP-7 is a 30-kDa modular glycoprotein known to be secreted by endothelial cells, vascular smooth muscle cells, fibroblasts, and epithelial cells (Ono, Y., et al., Biochem Biophys Res Comm 202 (1994) 1490-1496). Preferably, the term "IGFBP-7" refers to human IGFBP-7. The sequence of the protein is well-known in the art and is e.g. accessible via Uni-Prot (Q16270, IBP7_HUMAN), or via GenBank (NP_001240764.1). A detailed definition of the biomarker IGFBP-7 is e.g. provided in WO 2008/089994 which herewith is incorporated by reference in its entirety. There are two isoforms of IGFBP-7, Isoform 1 and 2 which are produced by alternative splicing. In an embodiment of the present invention, the total amount of both isoforms is determined (for the sequence, see the UniProt database entry (Q16270-1 and Q16270-2)).

IGF binding protein 7 (=IGFBP7) is a 30-kDa modular glycoprotein known to be secreted by endothelial cells, vascular smooth muscle cells, fibroblasts, and epithelial cells (Ono, Y., et al., Biochem Biophys Res Comm 202 (1994) 1490-1496). In the literature this molecule has also been denominated as FSTL2; IBP 7; IGF binding protein related protein I; IGFBP 7; IGFBP 7v; IGFBP rPl; IGFBP7; IGFB-PRP1; insulin like growth factor binding protein 7; insulin like growth factor binding protein 7 precursor; MAC25; MAC25 protein; PGI2 stimulating factor; and PSF or Prostacyclin stimulating factor. Northern blot studies revealed a wide expression of this gene in human tissues, including heart, brain, placenta, liver, skeletal muscle, and pancreas (Oh, Y., et al., J. Biol. Chem. 271 (1996) 30322-30325).

IGFBP7 was initially identified as a gene differentially expressed in normal leptomeningeal and mammary epithelial cells, compared with their counterpart tumor cells, and named meningioma-associated cDNA (MAC25) (Burger, A. M., et al., Oncogene 16 (1998) 2459-2467). The expressed protein was independently purified as a tumor derived adhesion factor (later renamed angiomodulin) (Sprenger, C. C., et al., Cancer Res 59 (1999) 2370-2375) and as a prostacyclin stimulating factor (Akaogi, K., et al., Proc Natl Acad Sci USA 93 (1996) 8384-8389). It has additionally been reported as T1Al2, a gene down-regulated in breast carcinomas (StCroix, B., et al., Science 289 (2000) 1197-1202).

Preferably, the term "IGFBP7" refers to human IGFBP7. The sequence of the protein is well known in the art and is e.g. accessible via GenBank (NP_001240764.1). IGFBP7 as used herein, preferably, encompasses also variants of the specific IGFBP7 polypeptides.

As used herein, the term "BNP-type peptide" comprises pre-proBNP, proBNP, NT-proBNP, and BNP. The pre-pro peptide (134 amino acids in the case of pre-proBNP) comprises a short signal peptide, which is enzymatically cleaved off to release the pro peptide (108 amino acids in the case of proBNP). The pro peptide is further cleaved into an N-terminal pro peptide (NT-pro peptide, 76 amino acids in case of NT-proBNP) and the active hormone (32 amino acids in the case of BNP). Preferably, BNP-type peptides according to the present invention are NT-proBNP, BNP, and variants thereof. BNP is the active hormone and has a shorter half-life than the respective inactive counterpart NT-proBNP. BNP is metabolized in the blood, whereas NT-proBNP circulates in the blood as an intact molecule and as such is eliminated renally. The in-vivo half-life of NT-proBNP is 120 min longer than that of BNP, which is 20 min (Smith 2000, J Endocrinol. 167: 239-46.). Preanalytics are more robust with NT-proBNP allowing easy transportation of the sample to a central laboratory (Mueller 2004, Clin Chem Lab Med 42: 942-4.). Blood samples can be stored at room temperature for several days or may be mailed or shipped without recovery loss. In contrast, storage of BNP for 48 hours at room temperature or at 4° Celsius leads to a concentration loss of at least 20% (Mueller loc.cit.; Wu 2004, Clin Chem 50: 867-73.). Therefore, depending on the time-course or properties of interest, either measurement of the active or the inactive forms of the natriuretic peptide can be advantageous. The most preferred natriuretic peptides according to the present invention are NT-proBNP or variants thereof. As briefly discussed above, the human NT-proBNP, as referred to in accordance with the present invention, is a polypeptide comprising, preferably, 76 amino acids in length corresponding to the N-terminal portion of the human NT-proBNP molecule. The structure of the human BNP and NT-proBNP has been described already in detail in the prior art, e.g., WO 02/089657, WO 02/083913 or Bonow loc. cit. Preferably, human NT-proBNP as used herein is human NT-proBNP as disclosed in EP 0 648 228 B 1. These prior art documents are herewith incorporated by reference with respect to the specific sequences of NT-proBNP and variants thereof disclosed therein.

CRP (C-reactive protein) is an acute phase protein that was discovered more than 75 years ago to be a blood protein that binds to the C-polysaccharide of pneumococci. CRP is known as a reactive inflammatory marker and is produced by a distal organ (i.e. the liver) in response or reaction to chemokines or interleukins originating from the primary lesion site. CRP is known to consist of five single subunits, which are non-covalently linked and assembled as a cyclic pentamer with a molecular weight of approximately 110-140 kDa. Preferably, CRP as used herein relates to human CRP. The sequence of human CRP is well known and disclosed, e.g., by Woo et al. (J. Biol. Chem. 1985. 260 (24), 13384-13388). The level of CRP is usually low in normal individuals but can rise 100- to 200-fold or higher due to inflammation, infection or injury (Yeh (2004) Circulation. 2004; 109:11-11-11-14). It is known that CRP is an independent factor for the prediction of a cardiovascular risk. Particularly, it has been shown that CRP is suitable as a predictor for myocardial infarction, stroke, peripheral arterial disease and sudden cardiac death. Moreover, elevated CRP amounts may also predict recurrent ischemia and death in subjects with acute coronary syndrome (ACS) and those undergoing coronary intervention.

The term "amount" as used herein encompasses the absolute amount of a biomarker as referred to herein, the relative amount or concentration of the said biomarker as well as any value or parameter which correlates thereto or can be derived therefrom. Such values or parameters comprise intensity signal values from all specific physical or chemical properties obtained from the said peptides by direct measurements, e.g., intensity values in mass spectra or NMR spectra. Moreover, encompassed are all values or parameters which are obtained by indirect measurements specified elsewhere in this description, e.g., response amounts determined from biological read out systems in response to the peptides or intensity signals obtained from specifically bound ligands. It is to be understood that values correlating to the aforementioned amounts or parameters can also be obtained by all standard mathematical operations.

In some embodiments of the present invention, the term "amount" refers to the "mass concentration" which is defined as the mass of the biomarker divided by the sample volume. The SI-unit for mass concentration is $kg/m^3$ (kilogram/cubic metre) which is the same as mg/mL and g/L. For the concentration of biomarkers, other units are commonly used such as "mg/ml" or "pg/ml". Accordingly, the amount of a biomarker may be the mass of the biomarker in 1 ml of the test sample.

The term "determining" the amount of a biomarker as referred to herein refers to the quantification of the biomarker, e.g. to determining the level of the biomarker in the sample, employing appropriate methods of detection described elsewhere herein.

In an embodiment, the amount of a biomarker is determined by contacting the sample with an agent that specifically binds to the biomarker, thereby forming a complex between the agent and said biomarker, detecting the amount of complex formed, and thereby determining the amount of said biomarker.

The biomarker as referred to herein can be detected using methods generally known in the art. Methods of detection generally encompass methods to quantify the amount of a biomarker in the sample (quantitative method). It is generally known to the skilled artisan which of the following methods are suitable for qualitative and/or for quantitative detection of a biomarker. Samples can be conveniently assayed for, e.g., proteins using Westerns and immunoassays, like ELISAs, RIAs, fluorescence- and luminescence-based immunoassays, which are commercially available. Further suitable methods to detect a biomarker include determining a physical or chemical property specific for the peptide or polypeptide such as its precise molecular mass or NMR spectrum. Said methods comprise, e.g., biosensors, optical devices coupled to immunoassays, biochips, analytical devices such as mass-spectrometers, NMR-analyzers, or chromatography devices. Further, methods include microplate ELISA-based methods, fully-automated or robotic immunoassays (available for example on Elecsys™ analyzers), CBA (an enzymatic Cobalt Binding Assay, available for example on Roche-Hitachi™ analyzers), and latex agglutination assays (available for example on Roche-Hitachi™ analyzers).

For the detection of biomarker proteins as referred to herein a wide range of immunoassay techniques using such an assay format are available, see, e.g., U.S. Pat. Nos. 4,016,043, 4,424,279, and 4,018,653. These include both single-site and two-site or "sandwich" assays of the non-competitive types, as well as in the traditional competitive binding assays. These assays also include direct binding of a labeled antibody to a target biomarker. Sandwich assays are among the most useful immunoassays.

Methods employing electrochemiluminescent labels are well-known. Such methods make use of the ability of special metal complexes to achieve, by means of oxidation, an excited state from which they decay to ground state, emitting electrochemiluminescence. For review see Richter, M. M., Chem. Rev. 104 (2004) 3003-3036.

In an embodiment, the detection antibody (or an antigen-binding fragment thereof) to be used for determining the amount of a biomarker is ruthenylated or iridinylated. Accordingly, the antibody (or an antigen-binding fragment thereof) shall comprise a ruthenium label. In an embodiment, said ruthenium label is a bipyridine-ruthenium(II) complex. Or the antibody (or an antigen-binding fragment thereof) shall comprise an iridium label. In an embodiment, said iridium label is a complex as disclosed in WO 2012/107419.

Determining the amount of a polypeptide (such as IGFBP-7) may, preferably, comprise the steps of (a) contacting the polypeptide with an agent that specifically binds said polypeptide (b) (optionally) removing non-bound agent, (c) determining the amount of bound binding agent, i.e. the complex of the agent formed in step (a). According to a preferred embodiment, said steps of contacting, optionally removing and determining may be performed by an analyzer unit. According to some embodiments, said steps may be performed by a single analyzer unit of said system or by more than one analyzer unit in operable communication with each other. For example, according to a specific embodiment, said system disclosed herein may include a first analyzer unit for performing said steps of contacting and optionally removing and a second analyzer unit, operably connected to said first analyzer unit by a transport unit (for example, a robotic arm), which performs said step of determining.

The agent which specifically binds the biomarker (herein also referred to as "binding agent") may be coupled covalently or non-covalently to a label allowing detection and measurement of the bound agent. Labeling may be done by direct or indirect methods. Direct labeling involves coupling of the label directly (covalently or non-covalently) to the binding agent. Indirect labeling involves binding (covalently or non-covalently) of a secondary binding agent to the first binding agent. The secondary binding agent should specifically bind to the first binding agent. Said secondary binding agent may be coupled with a suitable label and/or be the target (receptor) of tertiary binding agent binding to the secondary binding agent. Suitable secondary and higher order binding agents may include antibodies, secondary antibodies, and well-known binding-systems such as the streptavidin-biotin system (Vector Laboratories, Inc.). The binding agent or substrate may also be "tagged" with one or more tags as known in the art. Such tags may then be targets for higher order binding agents. Suitable tags include biotin, digoxygenin, His-Tag, Glutathion-S-Transferase, FLAG, GFP, myc-tag, influenza A virus haemagglutinin (HA), maltose binding protein, and the like. In the case of a peptide or polypeptide, the tag is preferably at the N-terminus and/or C-terminus. Suitable labels are any labels detectable by an appropriate detection method. Typical labels include gold particles, latex beads, acridan ester, luminol, ruthenium complexes, iridium complexes, enzymatically active labels, radioactive labels, magnetic labels ("e.g. magnetic beads", including paramagnetic and superparamagnetic labels), and fluorescent labels. Enzymatically active labels include e.g. horseradish peroxidase, alkaline phosphatase, beta-Galactosidase, Luciferase, and derivatives thereof. Suitable substrates for detection include di-amino-benzidine (DAB), 3,3'-5,5'-tetramethylbenzidine, NBT-BCIP (4-nitro blue tetrazolium chloride and 5-bromo-4-chloro-3-indolyl-phosphate, available as ready-made stock solution from Roche Diagnostics), CDP-Star™ (Amersham Bio-sciences), ECF™ (Amersham Biosciences). A suitable enzyme-substrate combination may result in a colored reaction product, fluorescence or chemoluminescence, which can be determined according to methods known in the art (e.g. using a light-sensitive film or a suitable camera system). As for determining the enzymatic reaction, the criteria given above apply analogously. Typical fluorescent labels include fluorescent proteins (such as GFP and its derivatives), Cy3, Cy5, Texas Red, Fluorescein, and the Alexa dyes (e.g. Alexa 568). Further fluorescent labels are available e.g. from Molecular Probes (Oregon). Also the use of quantum dots as fluorescent labels is contemplated. A radioactive label can be detected by any method known and appropriate, e.g. a light-sensitive film or a phosphor imager.

The amount of a polypeptide may be, also preferably, determined as follows: (a) contacting a solid support comprising a binding agent for the polypeptide as described elsewhere herein with a sample comprising the peptide or polypeptide and (b) determining the amount of peptide or polypeptide which is bound to the support. Materials for manufacturing supports are well-known in the art and include, inter alia, commercially available column materials, polystyrene beads, latex beads, magnetic beads, colloid metal particles, glass and/or silicon chips and surfaces, nitrocellulose strips, membranes, sheets, duracytes, wells and walls of reaction trays, plastic tubes etc.

In yet another aspect the sample is removed from the complex formed between the binding agent and one marker prior to the measurement of the amount of formed complex. Accordingly, in an aspect, the binding agent may be immobilized on a solid support. In yet another aspect, the sample can be removed from the formed complex on the solid support by applying a washing solution.

"Sandwich assays" are among the most useful and commonly used assays encompassing a number of variations of the sandwich assay technique. Briefly, in a typical assay, an unlabeled (capture) binding agent is immobilized or can be immobilized on a solid substrate, and the sample to be tested is brought into contact with the capture binding agent. After a suitable period of incubation, for a period of time sufficient to allow formation of a binding agent-biomarker complex, a second (detection) binding agent labeled with a reporter molecule capable of producing a detectable signal is then added and incubated, allowing time sufficient for the formation of another complex of binding agent-biomarker-labeled binding agent. Optionally, any unreacting material may be washed away. The presence of the biomarker is determined by observation of a signal produced by the reporter molecule bound to the detection binding agent. The results may either be qualitative, by simple observation of a visible signal, or may be quantitated by comparison with a control sample containing known amounts of biomarker.

The incubation steps of a typical sandwich assays can be varied as required and appropriate. Such variations include for example simultaneous incubations, in which two or more of binding agent and biomarker are co-incubated. For example, both, the sample to be analyzed and a labeled binding agent are added simultaneously to an immobilized capture binding agent. It is also possible to first incubate the sample to be analyzed and a labeled binding agent and to thereafter add an antibody bound to a solid phase or capable of binding to a solid phase.

The formed complex between a specific binding agent and the biomarker shall be proportional to the amount of the biomarker present in the sample. It will be understood that the specificity and/or sensitivity of the binding agent to be applied defines the degree of proportion of at least one marker comprised in the sample which is capable of being specifically bound. Further details on how the measurement can be carried out are also found elsewhere herein. The amount of formed complex shall be transformed into an amount of the biomarker reflecting the amount indeed present in the sample.

The terms "binding agent", "specific binding agent", "analyte-specific binding agent", "detection agent" and "agent that specifically binds to a biomarker" are used interchangeably herein. Preferably it relates to an agent that comprises a binding moiety which specifically binds the corresponding biomarker. Examples of "binding agents" or "agents" are a nucleic acid probe, nucleic acid primer, DNA molecule, RNA molecule, aptamer, antibody, antibody fragment, peptide, peptide nucleic acid (PNA) or chemical compound. A preferred agent is an antibody, or antigen-binding fragment thereof, which specifically binds to the biomarker to be determined. The term "antibody" herein is used in the broadest sense and encompasses various antibody structures, including but not limited to monoclonal antibodies, polyclonal antibodies, multispecific antibodies (e.g., bispecific antibodies), and antibody fragments as long as they exhibit the desired antigen-binding activity (i.e. antigen-binding fragments thereof). Preferably, the antibody is a polyclonal antibody. More preferably, the antibody is a monoclonal antibody.

The term "specific binding" or "specifically bind" refers to a binding reaction, wherein binding pair molecules exhibit a binding to each other under conditions where they do not significantly bind to other molecules. The term "specific binding" or "specifically binds", when referring to a protein or peptide as biomarker, refers to a binding reaction wherein a binding agent binds to the corresponding biomarker with an affinity of at least $10^{-7}$ M. The term "specific binding" or "specifically binds" preferably refers to an affinity of at least $10^{-8}$ M or even more preferred of at least $10^{-9}$ M for its target molecule. The term "specific" or "specifically" is used to indicate that other molecules present in the sample do not significantly bind to the binding agent specific for the target molecule.

In step (b) of present invention, (i) a ratio of the amount of IGFBP7 and the amount of the BNP-peptide. Alternatively, (ii) a ratio of the sum of the amounts of IGFBP7 and CRP and the amount of the BNP-type peptide.

The term "calculating a ratio" as referred to herein relates to calculating a ratio of the amount of i) IGFBP7 or ii) the sum of the amounts of IGFBP7 and CRP, and the amount of a BNP-type peptide by dividing the said amount or by carrying out any other comparable mathematical calculation which puts into a relation the amount in i) or ii) towards the amount of a BNP-type peptide. Preferably, the amount of in i) or ii) is divided by the amount of the BNP-type peptide in order to calculate the ratio (thus, the ratio of the amount of i) or ii) to the amount of a BNP-type peptide is calculated).

In some embodiments, the sum of the amounts of IGFBP7 and CRP is determined by adding up the amounts of IGFBP7 and CRP, e.g. by adding up the mass concentration of IGFBP7 and the mass concentration of CRP. Typically, the same units are used for the amounts of CRP and IGFBP7, for example "ng/mL". The determined sum of the amounts of IGFBP7 and CRP is then divided by the amount of the BNP-type peptide. For the BNP-type peptide, the same unit may be used for the amount as for CRP and IGFBP7. However, it is also envisaged that the amount in pg/ml is used for the calculation. In some embodiments, the amounts in ng/ml are used for CRP and IGFBP7, whereas the amount in pg/ml is used for the BNP-type peptide.

If the amount of in i) or ii) is divided by the amount of the BNP-type peptide in order to calculate the ratio, the following ratios are calculated:

1. IGFBP7/BNP-type peptide (i.e. a ratio of the amount of IGFBP7 to the amount of the BNP-type peptide), or
2. (IGFBP7+CRP)/BNP-type peptide (i.e. a ratio of the sum of the amounts of IGFBP7 and CRP to the amount of the BNP-type peptide)

If the above ratios (1. or 2.) are determined, the following applies as diagnostic algorithm in the method of differentiating between HFpEF and HFrEF.

Preferably, a ratio which is above the reference ratio is indicative for heart failure with preserved ejection fraction (HFpEF), whereas a ratio which is below the reference ratio is indicative for heart failure with reduced ejection fraction (HFrEF).

If the above ratios (1. or 2.) are determined, the following applies as diagnostic algorithm in the method for diagnosing HFpEF.

Preferably, a ratio which is above the reference ratio is indicative for a subject suffering from heart failure with preserved ejection fraction (HFpEF), whereas a ratio which is below the reference ratio is indicative for a subject not suffering from HFpEF, i.e. for a subject with HF or suspected of having HF and not suffering from HFpEF.

Also preferably, the amount of a BNP-type peptide is divided by the amount of i) or ii) in order to calculate the ratio (thus, the ratio of the amount of a BNP-type peptide to the amount of i) or ii) is calculated).

Accordingly, the following ratios are calculated
3. BNP-type peptide/IGFBP7, or
4. BNP-type peptide/(IGFBP7+CRP)

If the above ratios (3. or 4.) are determined, the following applies as diagnostic algorithm in the method of differentiating between HFpEF and HFrEF.

Preferably, a ratio which is below the reference ratio is indicative for heart failure with preserved ejection fraction (HFpEF), whereas a ratio which is above the reference ratio is indicative for heart failure with reduced ejection fraction (HFrEF).

If the above ratios (3. or 4.) are determined, the following applies as diagnostic algorithm in the method for diagnosing HFpEF.

Preferably, a ratio which is below the reference ratio is indicative for a subject suffering from heart failure with preserved ejection fraction (HFpEF), whereas a ratio which is above the reference ratio is indicative for a subject not suffering from HFpEF, i.e. for a subject with HF or suspected of having HF and not suffering from HFpEF.

In step c) of the method of the present invention, the ratio calculated in step (b) shall be compared with a reference ratio.

The term "comparing" as used herein preferably refers to comparing the ratio as calculated in accordance with the methods of the present invention with a reference ratio, i.e. a suitable reference ration. It is to be understood that comparing as used herein usually refers to a comparison of values. The comparison may be carried out manually or computer-assisted. Thus, the comparison may be carried out by a computing device. The value of the calculated ratio and the reference ratio can be, e.g., compared to each other and the said comparison can be automatically carried out by a computer program executing an algorithm for the comparison. The computer program carrying out the said evaluation will provide the desired assessment in a suitable output format. For a computer-assisted comparison, the value of the calculated ratio may be compared to values corresponding to suitable reference ratios which are stored in a database by a computer program. The computer program may further evaluate the result of the comparison, i.e. automatically provide the desired assessment in a suitable output format. The result of the comparison may, preferably, serve as an aid for the diagnosis of HFpEF or the differentiation between HFpEF and HFrEF.

In the method for differentiating HFpEF and HFrEF, it is possible to differentiate, in a subject with heart failure, between HFpEF and HfrEF based on the comparison of the calculated ratio with the reference ratio. Therefore, the reference ratio in the method for differentiating between HFpEF and HFrEF is to be chosen so that either a difference or a similarity in the compared values allows for differentiating between HFpEF and HFrEF. In accordance with the differentiation between HFpEF and HfrEF, the term "reference ratio" thus refers to a value/ratio which allows differentiation between HFpEF and HFrEF. Thus, the reference ratio can be a threshold which separates these groups from each other.

In the method for diagnosing HFpEF, it is possible to differentiate, between a subject suffering from HFpEF and a subject not suffering from HFpEF based on the comparison of the calculated ratio with the reference ratio. Therefore, the reference ratio in this is to be chosen so that either a difference or a similarity in the compared values allows for differentiating between HFpEF and HFrEF. In accordance with the diagnosis of HFpEF, the term "reference ratio" thus refers to a value/ratio which allows for differentiating between a subject suffering from HFpEF and a subject not suffering from HFpEF.

The reference ratio applicable for an individual subject may vary depending on various physiological parameters such as age, gender, or subpopulation, as well as on the means used for the determination of the polypeptide or peptide referred to herein. A suitable reference ratio may be determined from a reference sample to be analyzed together, i.e. simultaneously or subsequently, with the test sample.

Reference ratios can, in principle, be calculated for a cohort of subjects as based on the average or mean ratios by applying standard methods of statistics. In particular, accuracy of a test such as a method aiming to diagnose an event, or not, is best described by its receiver-operating characteristics (ROC) (see especially Zweig 1993, Clin. Chem. 39:561-577). The ROC graph is a plot of all of the sensitivity versus specificity pairs resulting from continuously varying the decision threshold over the entire range of data observed.

The clinical performance of a diagnostic method depends on its accuracy, i.e. its ability to correctly allocate subjects to a certain differentiation or diagnosis. The ROC plot indicates the overlap between the two distributions by plotting the sensitivity versus 1-specificity for the complete range of thresholds suitable for making a distinction. On the y-axis is sensitivity, or the true-positive fraction, which is defined as the ratio of number of true-positive test results to the product of number of true-positive and number of false-negative test results. This has also been referred to as positivity in the presence of a disease or condition. It is calculated solely from the affected subgroup. On the x-axis is the false-positive fraction, or 1-specificity, which is defined as the ratio of number of false-positive results to the product of number of true-negative and number of false-positive results. It is an index of specificity and is calculated entirely from the unaffected subgroup. Because the true- and false-positive fractions are calculated entirely separately, by using the test results from two different subgroups, the ROC plot is independent of the prevalence of the event in the cohort. Each point on the ROC plot represents a sensitivity/-specificity pair corresponding to a particular decision threshold. A test with perfect discrimination (no overlap in the two distributions of results) has an ROC plot that passes through the upper left corner, where the true-positive fraction is 1.0, or 100% (perfect sensitivity), and the false-positive fraction is 0 (perfect specificity). The theoretical plot for a test with no discrimination (identical distributions of results for the two groups) is a 45 diagonal line from the lower left corner to the upper right corner. Most plots fall in between these two extremes. If the ROC plot falls completely below the 45 diagonal, this is easily remedied by reversing the criterion for "positivity" from "greater than" to "less than" or vice versa. Qualitatively, the closer the plot is to the upper left corner, the higher the overall accuracy of the test. Dependent on a desired confidence interval, a threshold can be derived from the ROC curve allowing for the differentiation or diagnosis as referred to herein with a proper balance of sensitivity and specificity, respectively. Accordingly, the reference to be used for the method of the present invention, i.e. a threshold which allows to discriminate between HFpEF or HFrEF, or which allows for diagnosing HFpEF can be generated, preferably, by establishing a ROC for said cohort as described above and deriving a threshold ratio therefrom. Dependent on a desired sensitivity and specificity for a diagnostic method, the ROC plot allows deriving suitable thresholds.

The definitions and explanations given herein above apply mutatis mutandis to the following methods of the present invention.

The present invention further concerns a computer-implemented method for differentiating between heart failure with preserved ejection fraction (HFpEF) and heart failure with reduced ejection fraction (HFrEF) in a subject suffering from heart failure, said method comprising the steps of
 (a) receiving, at a processing unit, a value for the amount of IGFBP7 (Insulin-like growth factor-binding protein 7), a value for the amount of a BNP-type peptide, and optionally a value for the amount of CRP (C-reactive protein) in a sample from the subject,
 (b) calculating, by said processing unit, (i) a ratio of the amount of IGFBP7 and the amount of the BNP-peptide or (ii) a ratio of the sum of the amounts of IGFBP7 and CRP and the amount of the BNP-type peptide,
 (c) comparing, by said processing unit, the ratio calculated in step (b) with a reference ratio, and (d) differentiating between heart failure with preserved ejection fraction (HFpEF) and heart failure with reduced ejection fraction (HFrEF).

The present invention further concerns a computer-implemented method for diagnosing heart failure with preserved ejection fraction (HFpEF) in a subject suspected of suffering from HFpEF, said method comprising the steps of
(a) receiving, at a processing unit, a value for the amount of IGFBP7 (Insulin-like growth factor-binding protein 7), a value for the amount of a BNP-type peptide, and optionally a value for the amount of CRP (C-reactive protein) in a sample from the subject,
(b) calculating, by said processing unit, (i) a ratio of the amount of IGFBP7 and the amount of the BNP-peptide or (ii) a ratio of the sum of the amounts of IGFBP7 and CRP and the amount of the BNP-type peptide,
(c) comparing, by said processing unit, the ratio calculated in step (b) with a reference ratio, and
(d) diagnosing heart failure with preserved ejection fraction.

The above-mentioned methods are a computer-implemented method. Preferably, all steps of the computer-implemented methods are performed by one or more processing units of a computer (or computer network). Thus, the assessment (i.e. the diagnosis or differentiation) in step (d) is carried out by a processing unit. Preferably, said assessment is based on the results of step (c).

The values received in step (a) shall be derived from the determination of the amount of IGFBP-7, a BNP-type peptide (and optionally CRP) in a sample from a subject as described elsewhere herein. Preferably, the values are values for the amounts of the markers. The values will be typically received by the processing unit by uploading or sending the value to the processing unit. Alternatively, the value can be received by the processing unit by inputting the value via an user interface.

In an embodiment of the aforementioned methods, the reference ratio, i.e. a value for the reference ratio, as set forth in step (c) is established from a memory.

In an embodiment of the aforementioned computer-implemented method of the present invention, the result of the assessment made in step d) is provided via a display, configured for presenting result.

In an embodiment of the aforementioned computer-implemented method of the present invention, the method may comprise the further step of transferring the information on the assessment made in step d) to the individual's electronic medical records.

The present invention further relates to computer program including computer-executable instructions for performing the steps of the computer-implemented method according to the present invention for differentiating between HFpEF and HfrEF, or for diagnosing HFpEF, when the program is executed on a computer or computer network. Typically, the computer program specifically may contain computer-executable instructions for performing the steps of the method as disclosed herein. Specifically, the computer program may be stored on a computer-readable data carrier.

The present invention further concerns a method for differentiating between heart failure with preserved ejection fraction (HFpEF) and heart failure with reduced ejection fraction (HFrEF) in a subject suffering from heart failure, said method comprising the steps of
(a) receiving a sample from the subject,
(b) determining the amounts of IGFBP7 (Insulin-like growth factor-binding protein 7), of a BNP-type peptide, and optionally of CRP (C-reactive protein) in the sample, and
(c) providing a value for the amounts of IGFBP7, the BNP-type peptide and optionally CRP to the attending physician, thereby allowing the differentiation between HFpEF and HfrEF.

The present invention further concerns a method for diagnosing heart failure with preserved ejection fraction (HFpEF) in a subject suspected of suffering from HFpEF, said method comprising the steps of
(a) receiving a sample from the subject,
(b) determining the amounts of IGFBP7 (Insulin-like growth factor-binding protein 7), of a BNP-type peptide, and optionally of CRP (C-reactive protein) in the sample, and
(c) providing a value for the amounts of IGFBP7, the BNP-type peptide and optionally CRP to the attending physician, thereby allowing the diagnosis of HFpEF.

The physician in accordance with the aforementioned methods shall be the physician who requested the determination of the biomarker IGFBP-7, of the BNP-type peptide, and optionally of CRP, for the diagnosis or differentiation, i.e. the physician is the attending physician. Said physician shall treat the subject to be tested. The aforementioned method shall aid the attending physician in the differentiation and diagnosis respectively.

Step a) of receiving the sample does not encompass the drawing of the sample from the subject. Rather, the sample which has been obtained from the subject (e.g. under supervision of the attending physician) is provided. For example, the sample can be provided by delivering the sample to a laboratory which carries out the determination of the amount of the biomarkers in said sample.

After the amounts have been determined, information on the value for the determined amounts or information of calculated ratio is provided to the physician. In addition, information on the value for the reference ratio can be provided. The provided information may further contain in indication whether a subject suffers from HFrEF or HFpEF.

Instead of providing a value for the amounts of IGFBP7, the BNP-type peptide and optionally CRP to the attending physician (as set forth in step c) of the aforementioned methods, a value for the ratio as set forth herein can be provided to the attending physician, thereby allowing the differentiation between HFpEF and HfrEF (or the diagnosis of HFpEF).

The method of the present invention for the diagnosis of HFpEF may further comprise the step of treating the subject based on the results of diagnosis. Preferably, a subject is treated who has been diagnosed by the method of the present invention to suffer from HFpEF. Accordingly, the method may comprise the step of selecting a subject who suffers from HFpEF. Said selection shall be based on the results of the comparison step.

The treatment may encompass any treatment which allows to treat HFpEF. The term encompasses life style changes, diet regimen, interventions on the body as well as administration of appropriate medicaments.

In some embodiments, the treatment encompasses administration of at least one medicament which allows to treat HFpEF. In some embodiments, the treatment includes administration of at least one medicament selected from the group consisting of angiotensin converting enzyme inhibitors (ACE inhibitors), angiotensin II receptor blockers (frequently also referred to as angiotensin II receptor antagonists), beta adrenergic blockers (herein also referred to as beta blockers), aldosterone antagonists and diuretics.

In an embodiment, an ACE inhibitor is administered, e.g. benazepril, captopril, cilazapril, enalapril, fosinopril, lisinopril, moexipril, perindopril, quinapril, ramipril, spirapril or trandolapril.

In an embodiment, a beta blocker is administered, e.g. cebutolol, alprenolol, atenolol, betaxolol, bisoprolol, bupranolol, carazolol, carteolol, carvedilol, celiprolol, metipranolol, metoprolol, nadolol, nebivolol, oxprenolol, penbutolol, pindolol, propanolol, sotalol, tanilolol or timolol.

In an embodiment, an angiotensin II receptor antagonist is administered, e.g. Losartan, Valsartan, Irbesartan, Candesartan, Telmisartan or Eprosartan.

In an embodiment, diuretics are administered, e.g. thiazide and thiazide-like diuretics, or K-sparing diuretics.

In an embodiment, an aldosterone antagonist is administered, e.g. Eplerone, Spironolactone, Canrenone, Mexrenone, or Prorenone.

Further therapies for the treatment of HFpEF are described in Tschöpe et al. (Clin Res Cardiol. 2018 January; 107(1):1-19. doi: 10.1007/s00392-017-1170-6. Epub 2017 Oct. 10) which herewith is incorporated by reference in its entirety. Preferably, the treatment includes administration of at least one medicament selected from the group consisting of a SGLT2 (sodium-glucose cotransporter-2)-inhibitor, a soluble guanylate cyclase stimulator, an inorganic nitrate, and an angiotensin receptor-neprilysin inhibitor (ARNi).

In an embodiment, the medicament is a SGLT2 (sodium-glucose cotransporter-2)-inhibitor. In another embodiment, the medicament is a soluble guanylate cyclase stimulator. In another embodiment, the medicament is an inorganic nitrate. In another embodiment, the medicament is an angiotensin receptor-neprilysin inhibitors (ARNi), i.e. a combination drug which comprises an neprilysin inhibitor (e.g. sacubitril) and an angiotensin receptor blocker (e.g. valsartan).

Further, the present invention to the use of IGFBP7, a BNP-type peptide and optionally CRP in a sample from a subject for differentiating between heart failure with preserved ejection fraction (HFpEF) and heart failure with reduced ejection fraction (HFrEF) or for diagnosing HFpEF.

The method of the present invention for differentiating between HFpEF and HFrEF may further comprise the step of treating the subject based on the results of differentiation. Typically, both the subject who has been diagnosed to suffer from HFpEF and the subject who has been diagnosed to suffer from HFrEF are treated. The subject who has been diagnosed to suffer from HFpEF is typically treated as set forth above in connection with the method of diagnosing HFpEF. In some embodiments, the treatment of this subject includes administration of at least one medicament selected from the group consisting of a SGLT2 (sodium-glucose cotransporter-2)-inhibitor, a soluble guanylate cyclase stimulator, an inorganic nitrate, and an angiotensin receptor-neprilysin inhibitor (ARNi).

A subject who has been identified to suffer from HFrEF is preferably treated according to the Guidelines. In some embodiments, the treatment of HFrEF includes administration of at least one medicament selected from the group consisting of angiotensin converting enzyme inhibitors (ACE inhibitors), angiotensin II receptor blockers (frequently also referred to as angiotensin II receptor antagonists), beta adrenergic blockers (herein also referred to as beta blockers), aldosterone antagonists and diuretics.

Finally, the present invention relates to the use of at least one detection agent which binds to IGFBP7, at least one detection agent which binds to a BNP-type peptide and optionally at least one detection agent which binds to CRP in a sample from a subject for differentiating between heart failure with preserved ejection fraction (HFpEF) and heart failure with reduced ejection fraction (HFrEF) or for diagnosing HFpEF.

In an embodiment, the detection agent is an antibody, or antigen-binding fragment thereof.

EMBODIMENTS OF THE INVENTION

The following embodiments of the present invention may be used in combination with any other embodiments described herein. The definitions and explanations provided herein above, apply mutatis mutandis to the following.

1. A method for differentiating between heart failure with preserved ejection fraction (HFpEF) and heart failure with reduced ejection fraction (HFrEF) in a subject suffering from heart failure, said method comprising the steps of
   (a) determining the amounts of IGFBP7 (Insulin-like growth factor-binding protein 7), of a BNP-type peptide, and optionally of CRP (C-reactive protein) in a sample from the subject,
   (b) calculating (i) a ratio of the amount of IGFBP7 and the amount of the BNP-peptide or (ii) a ratio of the sum of the amounts of IGFBP7 and CRP and the amount of the BNP-type peptide,
   (c) comparing the ratio calculated in step (b) with a reference ratio, and
   (d) differentiating between heart failure with preserved ejection fraction (HFpEF) and heart failure with reduced ejection fraction (HFrEF).

2. The method of embodiment 1, wherein the subject is human.

3. The method of embodiments 1 and 2, wherein the sample is a blood, serum or plasma sample.

4. The method of any one of embodiments 1 to 3, wherein the BNP-type peptide is BNP or NT-proBNP.

5. The method of any one of embodiments 1 to 4, wherein a ratio of the amount of IGFBP7 to the amount of the BNP-type peptide is calculated.

6. The method of any one of embodiments 1 to 4, wherein a ratio of the sum of the amounts of IGFBP7 and CRP to the amount of the BNP-type peptide is calculated.

7. The method of embodiment 5 or 6, wherein a ratio which is above the reference ratio is indicative for heart failure with preserved ejection fraction (HFpEF) and/or wherein a ratio which is below the reference ratio is indicative for heart failure with reduced ejection fraction (HFrEF).

8. A method for diagnosing heart failure with preserved ejection fraction (HFpEF) in a subject suspected of suffering from HFpEF, said method comprising the steps of
   (a) determining the amounts of IGFBP7 (Insulin-like growth factor-binding protein 7), of a BNP-type peptide, and optionally of CRP (C-reactive protein) in a sample from the subject,
   (b) calculating (i) a ratio of the amount of IGFBP7 and the amount of the BNP-peptide or (ii) a ratio of the sum of the amounts of IGFBP7 and CRP and the amount of the BNP-type peptide,
   (c) comparing the ratio calculated in step (b) with a reference ratio, and
   (d) diagnosing heart failure with preserved ejection fraction.

9. A computer-implemented method for differentiating between heart failure with preserved ejection fraction (HFpEF) and heart failure with reduced ejection fraction (HFrEF) in a subject suffering from heart failure, said method comprising the steps of
   (a) receiving, at a processing unit, a value for the amount of IGFBP7 (Insulin-like growth factor-binding protein 7), a value for the amount of a BNP-type peptide, and optionally a value for the amount of CRP (C-reactive protein) in a sample from the subject,
   (b) calculating, by said processing unit, (i) a ratio of the amount of IGFBP7 and the amount of the BNP-peptide or (ii) a ratio of the sum of the amounts of IGFBP7 and CRP and the amount of the BNP-type peptide,
   (c) comparing, by said processing unit, the ratio calculated in step (b) with a reference ratio, and
   (d) differentiating between heart failure with preserved ejection fraction (HFpEF) and heart failure with reduced ejection fraction (HFrEF).
10. A computer-implemented method for diagnosing heart failure with preserved ejection fraction (HFpEF) in a subject suspected of suffering from HFpEF, said method comprising the steps of
   (a) receiving, at a processing unit, a value for the amount of IGFBP7 (Insulin-like growth factor-binding protein 7), a value for the amount of a BNP-type peptide, and optionally a value for the amount of CRP (C-reactive protein) in a sample from the subject,
   (b) calculating, by said processing unit, (i) a ratio of the amount of IGFBP7 and the amount of the BNP-peptide or (ii) a ratio of the sum of the amounts of IGFBP7 and CRP and the amount of the BNP-type peptide,
   (c) comparing, by said processing unit, the ratio calculated in step (b) with a reference ratio, and
   (d) diagnosing heart failure with preserved ejection fraction.
11. The method of embodiments 9 and 10, wherein the reference ratio is established from a memory.
12. A method for differentiating between heart failure with preserved ejection fraction (HFpEF) and heart failure with reduced ejection fraction (HFrEF) in a subject suffering from heart failure, said method comprising the steps of
   (a) receiving a sample from the subject,
   (b) determining the amounts of IGFBP7 (Insulin-like growth factor-binding protein 7), of a BNP-type peptide, and optionally of CRP (C-reactive protein) in the sample, and
   (c) providing a value for the amounts of IGFBP7, the BNP-type peptide and optionally CRP to the attending physician, thereby allowing the differentiation between HFpEF and HfrEF.
13. A method for diagnosing heart failure with preserved ejection fraction (HFpEF) in a subject suspected of suffering from HFpEF, said method comprising the steps of
   (a) receiving a sample from the subject,
   (b) determining the amounts of IGFBP7 (Insulin-like growth factor-binding protein 7), of a BNP-type peptide, and optionally of CRP (C-reactive protein) in the sample, and
   (c) providing a value for the amounts of IGFBP7, the BNP-type peptide and optionally CRP to the attending physician, thereby allowing the diagnosis of HFpEF.
14. Use of IGFBP7, a BNP-type peptide and optionally CRP as biomarkers in a sample from a subject for differentiating between heart failure with preserved ejection fraction (HFpEF) and heart failure with reduced ejection fraction (HFrEF) or for diagnosing HFpEF.
15. Use of at least one detection agent which binds to IGFBP7, at least one detection agent which binds to a BNP-type peptide and optionally at least one detection agent which binds to CRP in a sample from a subject for differentiating between heart failure with preserved ejection fraction (HFpEF) and heart failure with reduced ejection fraction (HFrEF) or for diagnosing HFpEF.

The Figures show:

FIG. 1 shows: Biomarker Measurements for the Diagnosis of HFpEF

Figure 2A:
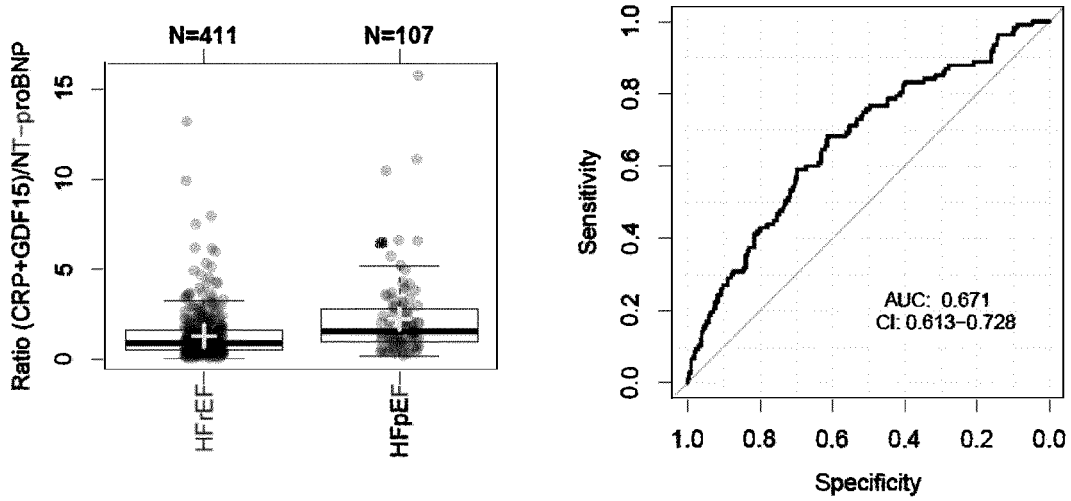
Figure 2B:
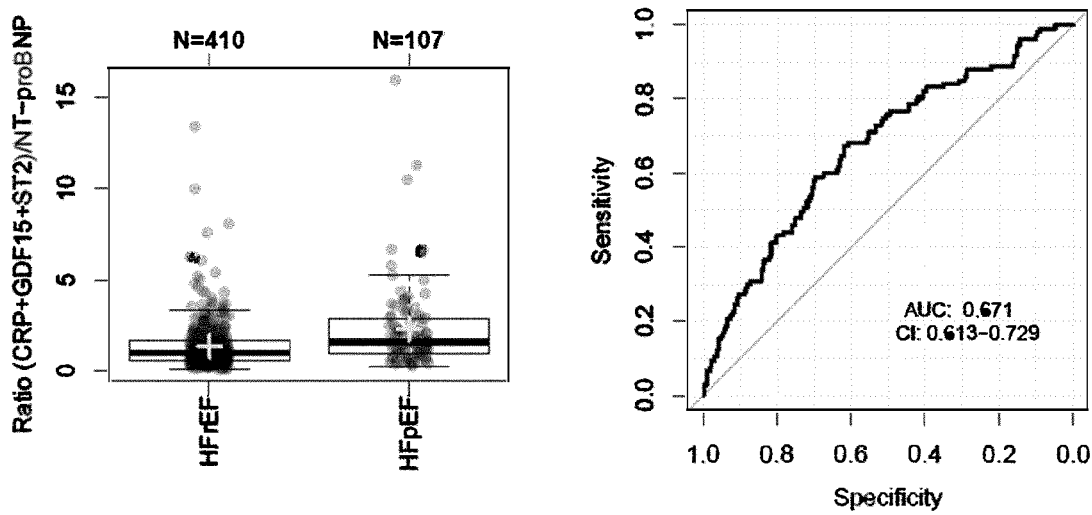
Figure 3A:
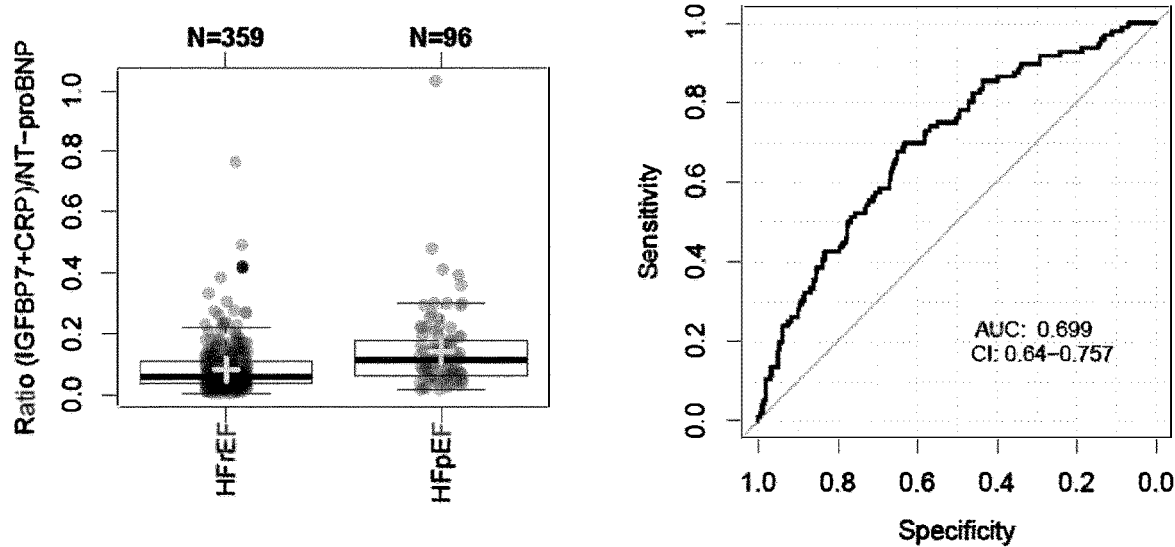
Figure 3B:
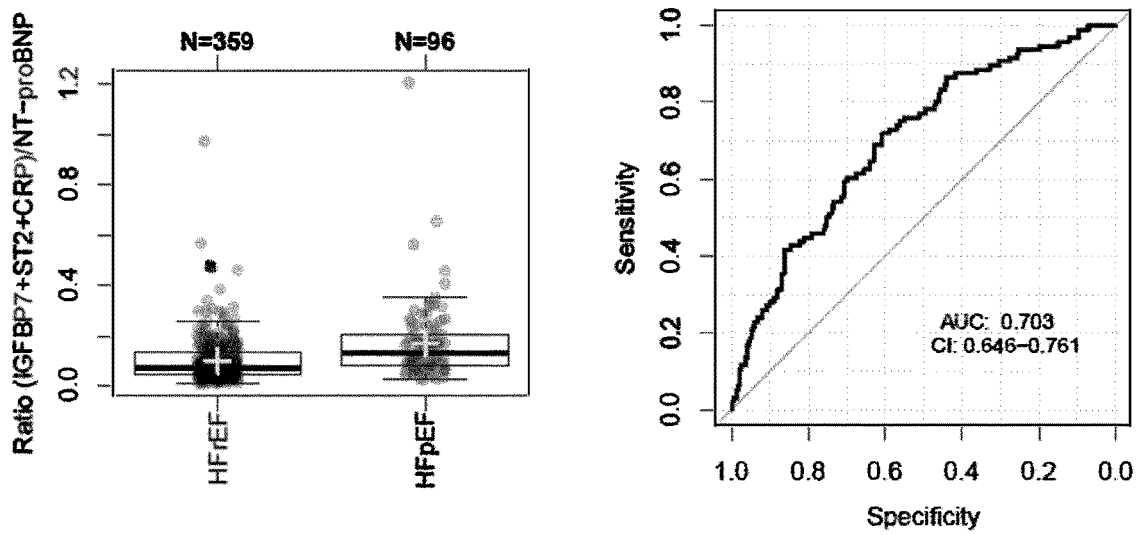
Figure 3C:
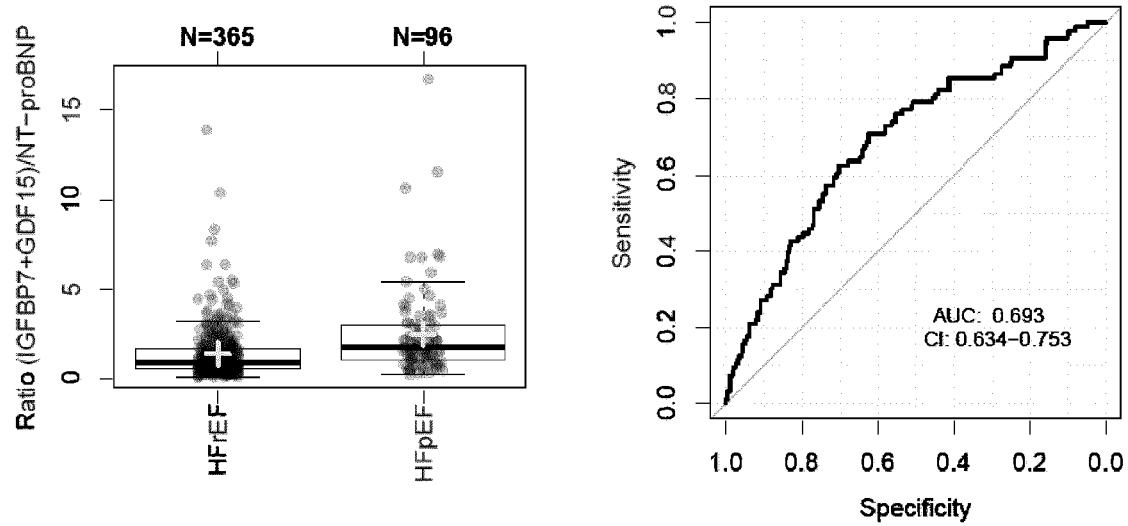

FIG. 1a: Measurement of NT-proBNP in 499 samples of patients with HFrEF and in 123 samples of patients with HFpEF for the Diagnosis of HFpEF FIG. 1b: Measurement of CRP in 411 samples of patients with HFrEF and in 107 samples of patients with HFpEF for the Diagnosis of HFpEF FIG. 1c: Measurement of GDF15 in 451 samples of patients with HFrEF and in 110 samples of patients with HFpEF for the Diagnosis of HFpEF FIG. 1d: Measurement of IGFBP-7 in 366 samples of patients with heart failure with HFrEF and in 96 samples of patients with HFpEF for the Diagnosis of HFpEF FIG. 2 shows: Biomarker Ratio with GDF15 for the Diagnosis of HFpEF FIG. 2a: Diagnosis of HFpEF versus HFrEF in patients with heart failure with the Ratio CRP+GDF15 (not elevated in HFrEF versus HFpEF)/NTproBNP (elevated in HFrEF versus HFpEF) in 410 samples of patients suffering from HFrEF versus 107 patients suffering from HFpEF FIG. 2b: Diagnosis of HFpEF versus HFrEF in patients with heart failure with the Ratio CRP+GDF15+ST2 (not elevated in HFrEF versus HFpEF)/NTproBNP (elevated in HFrEF versus HFpEF) in 411 samples of patients suffering from HFrEF versus 107 patients suffering from HFpEF FIG. 3 shows: Biomarker Ratio with IGFBP-7 for the Diagnosis of HFpEF FIG. 3a: Diagnosis of HFpEF versus HFrEF in patients with heart failure with the Ratio CRP+IGFBP-7 (not elevated in HFrEF versus HFpEF)/NTproBNP (elevated in HFrEF versus HFpEF) in 359 samples of patients suffering from HFrEF versus 96 patients suffering from HFpEF FIG. 3b: Diagnosis of HFpEF versus HFrEF in patients with heart failure with the Ratio CRP+IGFBP-7+ST2 (not elevated in HFrEF versus HFpEF)/NTproBNP (elevated in HFrEF versus HFpEF) in 359 samples of patients suffering from HFrEF versus 96 patients suffering from HFpEF FIG. 3c: Diagnosis of HFpEF versus HFrEF in patients with heart failure with the Ratio GDF-15+IGFBP-7 (not elevated in HFrEF versus HFpEF) NTproBNP (elevated in HFrEF versus HFpEF)

All references cited herein are herewith incorporated by reference with respect to their disclosure content in general or with respect to the specific disclosure contents indicated above.

The invention will now be illustrated by the following Examples which are not intended to restrict or limit the scope of this invention.

EXAMPLES

Example 1: Assessment of HFpEF with Circulating Biomarkers

NTproBNP, GDF-15, ST2, CRP (hs CRP) and IGFBP-7 levels were determined in HF patients with and without reduced ejection fraction.

The results are shown in FIG. 1. NTproBNP was significantly elevated in patients with heart failure with reduced ejection fraction (HFrEF) in comparison to patients with heart failure with preserved ejection fraction (HFpEF) (AUC 0.659), see FIG. 1a. FIG. 1b shows that CRP was not significantly elevated in patients with heart failure with reduced ejection fraction (HFrEF) in comparison to patients with heart failure with preserved ejection fraction (HFpEF) (AUC 0.575). FIG. 1c shows that GDF15 is not significantly elevated in patients with heart failure with reduced ejection fraction (HFrEF) in comparison to patients with heart failure with preserved ejection fraction (HFpEF) (AUC 0.554). FIG. 1d shows that IGFBP-7 is not significantly elevated in patients with heart failure with reduced ejection fraction (HFrEF) in comparison to patients with heart failure with preserved ejection fraction (HFpEF) (AUC 0.494).

Table 1 shows the titers of circulating biomarkers in the subgroups of heart failure patients with reduced ejection fraction (HFrEF) and in the subgroup of heart failure patients with preserved ejection fraction (HFpEF). Biomarker data of the complete set of biomarkers (NTproBNP, GDF15, ST2, CRPhs and IGFBP7) were available for 366 samples of patients with HFrEF and for 96 patient samples with HFpEF.

TABLE 1

Titers of circulating biomarkers in HFpEF versus HFrEF patients.

| Biomarkers Median values | HFrEF population n = 366 | HFpEF population n = 96 | p-value |
| --- | --- | --- | --- |
| NT-proBNP (pg/mL) | 4410 | 2189 | <0.001 |
| GDF-15 (pg/mL) | 3939 | 4304 | >0.001 |
| ST2 (ng/mL) | 35.7 | 37.6 | >0.001 |
| CRP hs (ng/mL) | 6.66 | 8.54 | >0.001 |
| IGFBP7 (ng/mL) | 242.1 | 237.1 | >0.001 |

Table 1 clearly shows that NTproBNP was detected with significant different marker concentrations in both subgroups (HFrEF population in comparison to HFrEF population) in univariate analyses.

HFrEF patients exhibited higher NT-proBNP titers in comparison to HFpEF patients [4410 vs. 2189 pg/mL median values, p<0.001]. In contrast for GDF15, ST2, CRP and IGFBP7 only slightly elevated marker concentrations were detected in the subgroup of HFpEF patients in comparison to the subgroup of HFrEF patients. However, the observed differences in marker concentrations between HFpEF and HFrEF were not significant for GDF15, ST2, CRPhs, IGFBP-7 in univariate analyses. HFpEF patients exhibited slightly higher GDF15, ST2, CRPhs, IGFBP-7 titers in comparison to HFrEF patients [4304 vs. 3939 pg/mL median values, 37.6 vs. 35.7 pg/mL; 8.54 vs. 6.66 ng/mL; 237.1 vs. 242.1 ng/mL; p>0.001].

It follows from the above that differential diagnosis and identification of patients with HFpEF is challenging. Only NTproBNP was observed with significant elevated circulating titers in HFrEF patients with HFpEF patients. In contrast no significant differences between marker levels in HFpEF and HFrEF patients were detected for CRP, GDF15, ST2 or IGFBP7. Thus there was no obvious hint for an improved diagnosis of HFpEF with a marker combination in comparison to measurement of NTproBNP.

Example 2: Ratio with GDF15 for the Diagnosis of HFpEF

As shown in Table 1, increased levels of circulating NTproBNP levels could be detected from patients with HFrEF in comparison to patients with HFpEF. In contrast, no significant difference of circulating levels between HF patients with or without reduced ejection fraction could be detected for CRP and GDF15.

A Ratio CRP+GDF15 (not elevated in HFrEF versus HFpEF)/NTproBNP (elevated in HFrEF versus HFpEF) was assessed for an improved diagnosis of HFpEF.

As shown in FIG. 2a the observed AUC of the Ratio (CRP+GDF15)/NTproBNP for the detection of HFpEF was 0.671. As shown in FIG. 2b, no further improvement could be achieved with the Ratio (CRP+GDF15+ST2)/NTproBNP in comparison to the Ratio (CRP+GDF15)/NTproBNP. The observed AUC of the Ratio (CRP+GDF15+ST2)/NTproBNP for the detection of HFpEF was 0.671.

Based on the results, it was concluded, that the Ratio (CRP+GDF15)/NTproBNP improves the diagnosis of HFpEF in comparison to single biomarker determinations of NTproBNP or GDF15 or CRP.

Example 3: Biomarker Ratio with IGFBP-7 for the Diagnosis of HFpEF

As shown in Table 1, increased levels of circulating NTproBNP levels could be detected from patients with HFrEF in comparison to patients with HFpEF. In contrast, no significant difference of circulating levels between HF patients with or without reduced ejection fraction could be detected for CRP and IGFBP-7. The Ratio CRP+IGFBP-7 (not elevated in HFrEF versus HFpEF)/NTproBNP (elevated in HFrEF versus HFpEF) was assessed for an improved diagnosis of HFpEF.

As shown in FIG. 3a the observed AUC of a calculated index of the sum of the biomarkers (CRP+IGFBP-7)/NTproBNP for the detection of HFpEF was 0.699. In comparison the observed AUC of the ratio IGFBP-7/NTproBNP for detection of HFpEF was 0.680. As shown in FIG. 3c the observed AUC of a calculated index of the sum of the biomarkers (GDF15+IGFBP-7)/NTproBNP for the detection of HF was 0.693. As shown in FIG. 3b comparable performances were observed with the Ratio (CRP+IGFBP-7+ST2)/NTproBNP in comparison to the Ratio (CRP+IGFBP-7)/NTproBNP. The observed AUC of the Ratio (CRP+IGFBP-7+ST2):NTproBNP for the detection of HFpEF was 0.703. Surprisingly the calculated index of the sum of the biomarkers (CRP+IGFBP-7):NTproBNP even showed superior performance for diagnosis of HFpEF versus the Ratio (CRP+GDF15)/NTproBNP. The Ratio (CRP+IGFBP-7)/NTproBNP even shows superior performance versus the Ratio (CRP+GDF15+ST2)/NTproBNP, which has been described by Sinning et al. (AUC 0.699 vs. AUC 0.671).

Table 2 shows fold changes of calculated indices in HFpEF versus HFrEF patients.

| Algorithms | Fold change HFpEF vs HFrEF |
|---|---|
| (IGFBP-7)/NTproBNP | 74.97% |
| (IGFBP-7 + CRP)/NTproBNP | 87.81% |
| (GDF15 + CRP)/NTproBNP | 66.49% |
| (GDF15 + CRP + ST2)/NTproBNP | 65.34% |

Fold changes were calculated ((median HFpEF)/(median HFrEF))−1*100.

Table 2 clearly shows the improved performance in differential diagnosis of HFpEF versus HFrEF of the calculated index of the sum of (IGFBP-7+CRP)/NTproBNP in comparison to the calculated index of the sum of (GDF15+CRP+ST2)/NTproBNP (Fold change 87.81% versus 65.34%). In comparison for the ratio IGFBP-7/NTproBNP a Fold change of 74.97% was observed.

⇨ In conclusion IGFFBP-7 improves the identification of HFpEF in comparison to NTproBNP, GDF15, CRP based scores without IGFBP-7.
⇨ The present score with IGFBP-7 shows a better effect size in comparison to the published score from Sinning et al.
⇨ It was concluded, that an algorithm including the Ratio (CRP+IGFBP-7)/NTproBNP is useful to aid in diagnosis of patients with HFpEF. The algorithm may be used in diagnosis of HFpEF in patients with heart failure and for identification of HFpEF in individuals suspected of having heart failure.

Example 4: Case Studies

A 76 year old female obese patient with hypertension presents with shortness of breath. NTproBNP, IGFBP-7 and CRP are determined in a serum sample obtained from the patient (With Elecsys NTproBNP, Elecsys IGFBP-7 and Cobas CRP). Since NTproBNP values might be in the grey zone because of the presence of obesity differential diagnosis of heart failure is performed. The NTproBNP value is 476 pg/mL, the IGFBP-7 value 190.8 ng/mL and the CRP value is 5.8 ng/mL. The calculated index (CRP+IGFBP-7):NTproBNP is 0.41 which is elevated versus a calculated reference ratio (0.09). The reference ratio was calculated as median ratio in a reference cohort. The obtained ratio (0.41) is indicative of heart failure with preserved ejection fraction and the patient has been identified to benefit more from a treatment with a HFpEF modifying strategy, eg treatment with SGLT2 inhibitors. The therapy of the patient is adapted accordingly.

A 81 year old male patient with hypertension presents with a history of atrial fibrillation and shortness of breath. NTproBNP, IGFBP-7 and CRP are determined in a serum sample obtained from the patient (with the kits described above). The observed ejection fraction is in the grey zone (50%). Since NTproBNP values may as well be elevated because of the presence of atrial fibrillation differential diagnosis of heart failure is performed. The NTproBNP value is 3289 pg/mL, the IGFBP-7 value 250.7 ng/mL and the CRP value is 10.8 ng/mL. The calculated index (CRP+IGFBP-7):NTproBNP is 0.79 which is elevated versus a calculated reference ratio (0.09). The reference ratio was calculated as Median ratio in a reference cohort. The obtained ratio (0.79) is indicative of heart failure with preserved ejection fraction and the patient has been identified to benefit more from a treatment with a HFpEF modifying strategy, eg treatment with SGLT2 inhibitors. The therapy of the patient is adapted accordingly.

A 68 year old obese female patient with Diabetes Mellitus and hypertension presents with symptoms of exercise intolerance. Since symptoms of obesity and symptoms of heart failure with preserved ejection fraction are similar, eg exercise intolerance differential diagnosis of heart failure is performed. NTproBNP, IGFBP-7 and CRP are determined in a serum sample obtained from the patient (with the kits described above). The NTproBNP value is 4643 pg/mL, the IGFBP-7 value 245.5 ng/mL and the CRP value is 5.6 ng/mL. The calculated index (CRP+IGFBP-7):NTproBNP is 0.05 which is reduced versus the reference ratio (0.09). This result is indicative of heart failure with reduced ejection fraction and the patient has been identified not to benefit more from a treatment with a HFpEF modifying strategy, eg treatment with SGLT2 inhibitors. Thus the therapy of the patient is not adapted accordingly.

The invention claimed is:

1. A method for differentiating between heart failure with preserved ejection fraction (HFpEF) and heart failure with reduced ejection fraction (HFrEF) in a subject suffering from heart failure, said method comprising the steps of
   (a) determining the amounts of IGFBP7 (Insulin-like growth factor-binding protein 7), a BNP-type peptide and CRP (C-reactive protein) in a blood, serum or plasma sample from the subject,
   (b) calculating a ratio of the sum of the amounts of IGFBP7 and CRP and the amount of the BNP-type peptide,
   (c) comparing the ratio calculated in step (b) with a reference ratio,
   (d) differentiating between heart failure with preserved ejection fraction (HFpEF) and heart failure with reduced ejection fraction (HFrEF), and
   (e) administering at least one medicament to the subject suffering from heart failure, wherein the at least one medicament is selected from the group consisting of a sodium-glucose cotransporter-2 inhibitor, a soluble guanylate cyclase stimulator, an inorganic nitrate, an angiotensin receptor-neprilysin inhibitor, angiotensin converting enzyme inhibitors, angiotensin II receptor blockers, beta adrenergic blockers, aldosterone antagonists, and diuretics.

2. The method of claim 1, wherein the subject is human.

3. The method of claim 1, wherein the BNP-type peptide is BNP or NT-proBNP.

4. The method of claim 1, wherein a ratio of the sum of the amounts of IGFBP7 and CRP to the amount of the BNP-type peptide is calculated by adding up the mass concentrations of IGFBP7 and CRP and dividing said sum by the mass concentration for the BNP-type peptide.

5. The method of claim 4, wherein a ratio which is above the reference ratio is indicative for heart failure with preserved ejection fraction (HFpEF) and/or wherein a ratio which is below the reference ratio is indicative for heart failure with reduced ejection fraction (HFrEF).

6. A method for diagnosing heart failure with preserved ejection fraction (HFpEF) in a subject suspected of suffering from HFpEF, said method comprising the steps of
   (a) determining the amounts of IGFBP7 (Insulin-like growth factor-binding protein 7), of a BNP-type peptide, and of CRP (C-reactive protein) in a blood, serum or plasma sample from the subject,
   (b) calculating a ratio of the sum of the amounts of IGFBP7 and CRP and the amount of the BNP-type peptide, (c) comparing the ratio calculated in step (b) with a reference ratio, (d) diagnosing heart failure with preserved ejection fraction, and (e) administering at least one medicament to the subject suspected of suffering from HFpEF, wherein the at least one medicament is selected from the group consisting of a sodium-glucose cotransporter-2 inhibitor, a soluble guanylate cyclase stimulator, an inorganic nitrate, an angiotensin receptor-neprilysin inhibitor, angiotensin converting enzyme inhibitors, angiotensin II receptor blockers, beta adrenergic blockers, aldosterone antagonists, and diuretics.

7. A method for differentiating between heart failure with preserved ejection fraction (HFpEF) and heart failure with reduced ejection fraction (HFrEF) in a subject suffering from heart failure, said method comprising the steps of (a) receiving a blood, serum or plasma sample from the subject, (b) determining the amounts of IGFBP7 (Insulin-like growth factor-binding protein 7), of a BNP-type peptide and of CRP (C-reactive protein) in the sample, (c) providing a value for a ratio of the sum of the amounts of IGFBP7 and CRP and the amount of the BNP-type peptide to the attending physician, thereby allowing the differentiation between HFpEF and HfrEF, and (d) administering at least one medicament to the subject suffering from heart failure, wherein the at least one medicament is selected from the group consisting of a sodium-glucose cotransporter-2 inhibitor, a soluble guanylate cyclase stimulator, an inorganic nitrate, an angiotensin receptor-neprilysin inhibitor, angiotensin converting enzyme inhibitors, angiotensin II receptor blockers, beta adrenergic blockers, aldosterone antagonists, and diuretics.

8. A method for diagnosing heart failure with preserved ejection fraction (HFpEF) in a subject suspected of suffering from HFpEF, said method comprising the steps of (a) receiving a blood, serum or plasma sample from the subject, (b) determining the amounts of IGFBP7 (Insulin-like growth factor-binding protein 7), of a BNP-type peptide and of CRP (C-reactive protein) in the sample, and (c) providing a value for a ratio of the sum of the amounts of IGFBP7 and CRP and the amount of BNP-type peptide to the attending physician, thereby allowing the diagnosis of HFpEF, and (d) administering at least one medicament to the subject suspected of suffering from HFpEF, wherein the at least one medicament is selected from the group consisting of a sodium-glucose cotransporter-2 inhibitor, a soluble guanylate cyclase stimulator, an inorganic nitrate, an angiotensin receptor-neprilysin inhibitor, angiotensin converting enzyme inhibitors, angiotensin II receptor blockers, beta adrenergic blockers, aldosterone antagonists, and diuretics.

9. The method of claim 6, wherein the subject is human.

10. The method of claim 6, wherein the BNP-type peptide is BNP or NT-proBNP.

* * * * *